(12) United States Patent
Takata et al.

(10) Patent No.: US 7,155,595 B2
(45) Date of Patent: Dec. 26, 2006

(54) METHOD OF CONTROLLING STORAGE DEVICE CONTROLLING APPARATUS, AND STORAGE DEVICE CONTROLLING APPARATUS

(75) Inventors: Yutaka Takata, Kanagawa (JP); Shinichi Nakayama, Kanagawa (JP); Hiroshi Ogasawara, Kanagawa (JP); Jinichi Shikawa, Chiba (JP); Nobuyuki Saika, Kanagawa (JP)

(73) Assignee: Hitachi, Ltd. (JP)

( * ) Notice: Subject to any disclaimer, the term of this patent is extended or adjusted under 35 U.S.C. 154(b) by 215 days.

(21) Appl. No.: 10/757,957

(22) Filed: Jan. 13, 2004

(65) Prior Publication Data

US 2004/0215878 A1    Oct. 28, 2004

(30) Foreign Application Priority Data

Jan. 20, 2003    (JP)    ............................ 2003-011594

(51) Int. Cl.
*G06F 12/10*    (2006.01)
(52) U.S. Cl. ...................................... 711/202; 711/114
(58) Field of Classification Search ................ 711/122, 711/114, 202
See application file for complete search history.

(56) References Cited

U.S. PATENT DOCUMENTS

| | | | |
|---|---|---|---|
| 6,311,252 B1 | 10/2001 | Raz | |
| 6,609,180 B1 | 8/2003 | Sanada et al. | |
| 6,772,306 B1 | 8/2004 | Suzuki et al. | |
| 2002/0152339 A1 | 10/2002 | Yamamoto et al. | |
| 2003/0196037 A1 | 10/2003 | Obara et al. | |

(Continued)

FOREIGN PATENT DOCUMENTS

JP    2002-351703    12/2002

OTHER PUBLICATIONS

Anderson et al. "An Application-Aware Data Storage Model," Proceedings of the 1999 USENIX Annual Technical Conference Monterey, CA (1999).

(Continued)

*Primary Examiner*—Matthew Kim
*Assistant Examiner*—Lev Iwashko
(74) *Attorney, Agent, or Firm*—Townsend and Townsend and Crew LLP

(57) ABSTRACT

A storage device controlling apparatus includes: a plurality of channel controllers having a circuit board on which are formed a file access processing section receiving requests to input and output data in files as units from an information processing apparatus and an I/O processor outputting I/O requests corresponding to the requests to input and output data to a storage device; and a disk controller executing input and output of data into and from the storage device in response to the I/O requests sent from the I/O processors. In the storage device controlling apparatus, the disk controller performs a replication management processing whereby data is also written into a second logical volume to store a copy of the data in the second logical volume, when the data is written into a first logical volume.

20 Claims, 21 Drawing Sheets

U.S. PATENT DOCUMENTS

| | | |
|---|---|---|
| 2003/0221077 A1 | 11/2003 | Ohno et al. |
| 2003/0229522 A1* | 12/2003 | Thompson et al. ............ 705/4 |
| 2004/0030730 A1 | 2/2004 | Arai et al. |
| 2004/0030766 A1* | 2/2004 | Witkowski .................. 709/223 |
| 2004/0088507 A1 | 5/2004 | Satoyama et al. |
| 2004/0103257 A1 | 5/2004 | Watanabe et al. |
| 2004/0123026 A1 | 6/2004 | Kaneko |
| 2004/0133752 A1 | 7/2004 | Suzuki et al. |
| 2004/0143688 A1 | 7/2004 | Sugimoto |
| 2004/0148329 A1 | 7/2004 | Ogasawara et al. |
| 2004/0153740 A1 | 8/2004 | Fujimoto |
| 2004/0172509 A1 | 9/2004 | Takeda et al. |
| 2004/0172510 A1 | 9/2004 | Nagashima et al. |
| 2004/0210713 A1 | 10/2004 | Kanai |

OTHER PUBLICATIONS

Hartug "IBM TotalStorage Enterprise Storage Server: A Designer's View," IBM Systems Journal 42:383-396 (2003).

Hsiao et al. "A Performance Study of Three High Availability Data Replication Strategies," Proceedings of the First International Conference on Parallel and Distributed Information Systems Miami, FL (1991).

* cited by examiner

162a

PHYSICAL DISK MANAGING TABLE

| DISK NUMBER | CAPACITY | RAID | USAGE STATE |
|---|---|---|---|
| #001 | 100GB | 5 | USED |
| #002 | 100GB | 5 | USED |
| #003 | 100GB | 5 | USED |
| #004 | 100GB | 5 | USED |
| #005 | 100GB | 5 | USED |
| #006 | 50GB | — | UNUSED |
| ⋮ | ⋮ | ⋮ | ⋮ |

162b

LU MANAGING TABLE

| LU NUMBER | PHYSICAL DISK | CAPACITY | RAID |
|---|---|---|---|
| #1 | #001,#002,#003,#004,#005 | 100GB | 5 |
| #2 | #001,#002,#003,#004,#005 | 300GB | 5 |
| #3 | #006,#007, | 200GB | 1 |
| ⋮ | ⋮ | ⋮ | ⋮ |

FIG. 13

730 METADATA

| FILE NAME | TOP ADDRESS | CAPACITY | OWNER | UPDATE TIME |
|---|---|---|---|---|
| A | 7BSA | 200MB | X | 0 : 00 |
| B | 05BF | 50MB | X | 7 : 57 |
| C | 1F30 | 100MB | Y | 9 : 15 |
| D | 470B | 100MB | Z | 15 : 20 |
| ⋮ | ⋮ | ⋮ | ⋮ | ⋮ |

FIG. 15

721 FILE LOCK TABLE

| FILE NAME | LOCK/UNLOCK |
|---|---|
| A | LOCKED |
| B | — |
| C | — |
| D | LOCKED |
| ⋮ | ⋮ |

722 LU LOCK TABLE

| LU | LOCK/UNLOCK |
|---|---|
| SHARED | — |
| 1 | LOCKED |
| 2 | — |
| ⋮ | ⋮ |

| TO-BE-COPIED LU (LUN) | TO-BE-COPIED -INTO LU (LUN) |
|---|---|
| 1 | 10 |
| 2 | 11 |
| 3 | 12 |
| 4 | 13 |
| 5 | 14 |

[ OK ]  [ CANCEL ]

| TO-BE-COPIED LU (LUN) | TO-BE-COPIED -INTO LU (LUN) | SPLIT | |
|---|---|---|---|
| 1 | 10 | EXECUTION | ▽ |
| 2 | 11 | | ▽ |
| 3 | 12 | | ▽ |
| 4 | 13 | | ▽ |
| 5 | 14 | | ▽ |

[ OK ]  [ CANCEL ]

FIG. 28

| PRIMARY LU (LUN) | SECONDARY LU (LUN) | METHOD |
|---|---|---|
| 1 | 10 | SYNCHRONOUS ▽ |
| 2 | 11 | ASYNCHRONOUS ▽ |
| 3 | 12 | ASYNCHRONOUS ▽ |
| 4 | 13 | ASYNCHRONOUS ▽ |
| 5 | 14 | SYNCHRONOUS ▽ |

OK   CANCEL

| FILE NAME | DIRECTORY NAME |
|---|---|
| FILE 1 | DIR 1 |
| FILE 2 | DIR 2 |
| FILE 3 | |
| FILE 4 | |

OK   CANCEL

2900

METHOD OF CONTROLLING STORAGE DEVICE CONTROLLING APPARATUS, AND STORAGE DEVICE CONTROLLING APPARATUS

CROSS-REFERENCE TO RELATED APPLICATIONS

The present application claims priority upon Japanese Patent Application No. 2003-011594 filed on Jan. 20, 2003, which is herein incorporated by reference.

BACKGROUND OF THE INVENTION

1. Field of the Invention

The present invention relates to a method of controlling a storage device controlling apparatus, and a storage device controlling apparatus.

2. Description of the Related Art

In recent years, the amount of data handled by computer systems has been greatly increased. As storage systems for managing these data, large-scale storage systems called a mid-range class or enterprise class, managed according to a RAID (Redundant Arrays of Inexpensive Disks) method which provides an enormous storage source, are drawing attention these days. Moreover, to efficiently manage the enormous amount of data, a technology has been developed, in which an exclusive network (Storage Area Network; hereinafter referred to as SAN) connects information processing apparatuses and a storage system such as a disk array apparatus to implement high-speed and massive access to the storage system.

Meanwhile, a storage system called a NAS (Network Attached Storage) has been developed, in which a network using TCP/IP (Transmission Control Protocol/Internet Protocol) protocols, etc., connects a storage system and information processing apparatuses to implement access in file level from the information processing apparatuses (e.g., Japanese Patent Application Laid-Open Publication No. 2002-351703).

However, a conventional NAS has been achieved by connecting information processing apparatuses having TCP/IP communication and file system functions to a storage system without TCP/IP communication and file system functions. Therefore, installation spaces have been required for the abovementioned information processing apparatuses to be connected. Moreover, the information processing apparatuses and storage system are usually connected by a SAN in order to perform high-speed communication. Thus, the information processing apparatus has been required to be provided with a communication controlling apparatus or a communication controlling function.

SUMMARY OF THE INVENTION

The present invention was made in view of the abovementioned problems, and the main object of the present invention is to provide a method of controlling a storage device controlling apparatus, and a storage device controlling apparatus.

The main invention according to the present invention for achieving the abovementioned object is a method of controlling a storage device controlling apparatus which includes:

a plurality of channel controllers having a circuit board on which are formed a file access processing section receiving requests to input and output data in files as units from an information processing apparatus via a network and an I/O processor outputting I/O requests corresponding to the requests to input and output data to a storage device; and a disk controller executing input and output of data into and from the storage device in response to the I/O requests sent from the I/O processors, and which manages a memory area provided by the storage device in logical volumes, which are memory areas logically set on the memory area, the method comprising the step of:

performing, by the disk controller, a replication management process whereby data is also written into a second logical volume to store the data in the second logical volume, when the data is written into a first logical volume.

Note that the information processing apparatus is, for example, a personal computer or a mainframe computer which accesses a storage system comprising the storage device controlling apparatus having the abovementioned structure via LAN or SAN. The function of the file access processing section is provided by an operating system executed on CPU and software such as NFS (Network File System) which runs on this operating system. The storage device is a disk drive such as a hard disk unit. The I/O processor comprises, for example, an IC (Integrated Circuit) separate from the CPU as a hardware element, which is the hardware element of the file access processing section, and controls the communication between the file access processing section and the disk controller. The disk controller writes and reads data into and from the storage device.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 13 is a view showing metadata according to the present embodiment;

FIG. 15 is a view showing lock tables according to the present embodiment;

FIG. 17 shows a setting Web page used for setting correspondence between to-be-copied LUs and to-be-copied-into LUs where a data copy in the respective to-be-copied LU is stored, according to the present embodiment;

FIG. 18 shows a setting Web page used for instructing a shift from a "pair state" to a "split state," according to the present embodiment;

FIG. 28 shows a setting Web page used for the setting of correspondence between primary LUs and secondary LUs for the remote copy function, according to the present embodiment;

FIG. 29 shows a setting Web page used for selecting individual files and directories, whether to apply the remote copy function, according to the present embodiment.

DETAILED DESCRIPTION OF THE INVENTION

Figure 1:
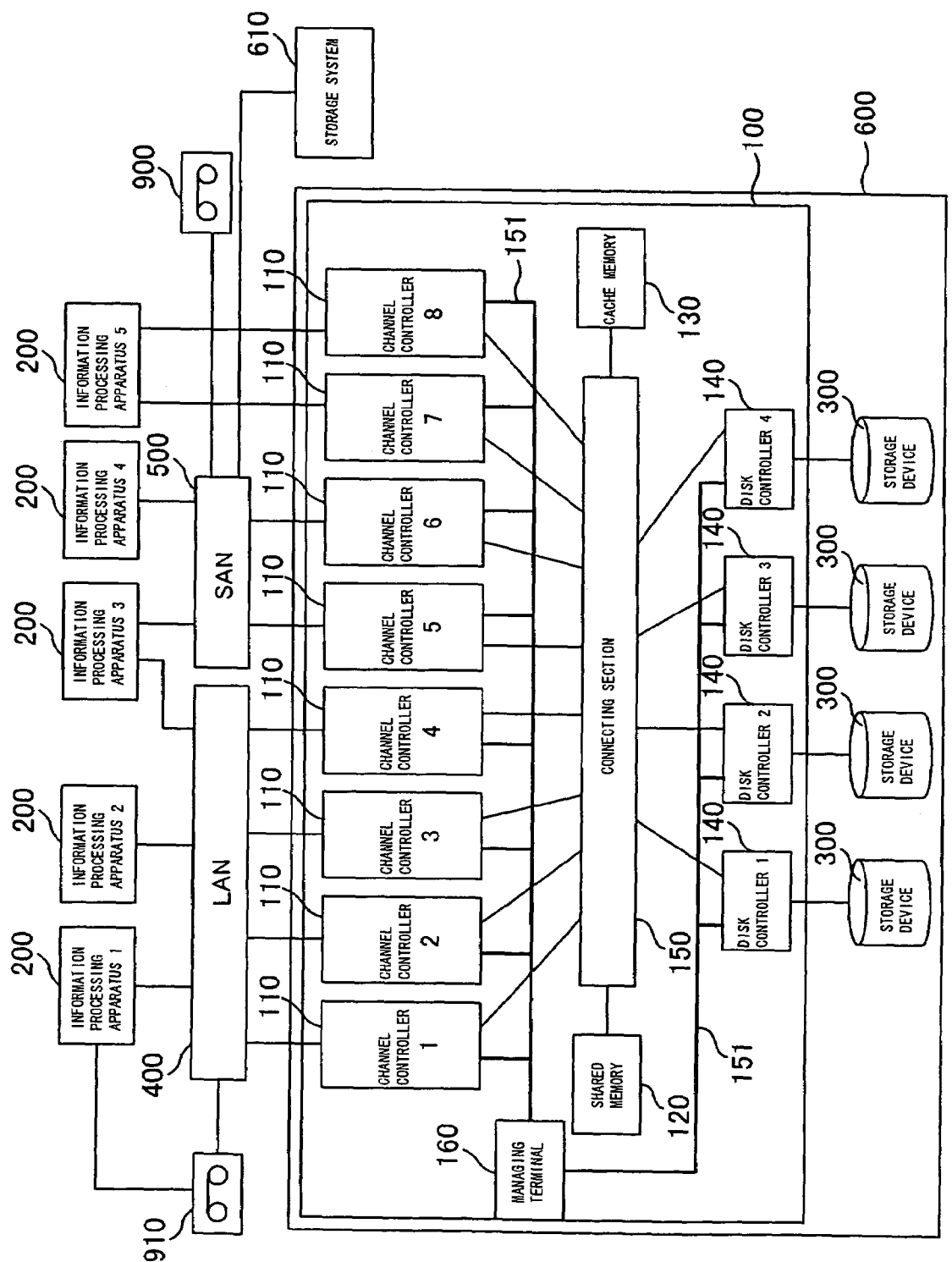
FIG. 1 is a block diagram showing the entire construction of a storage system according to the present embodiment.

At least the following matters will be made clear by the explanation in the present specification and the description of the accompanying drawings.

Example of the Entire Construction

The storage system 600 comprises a storage device controlling apparatus 100 and storage devices 300. The storage device controlling apparatus 100 controls the storage devices 300 according to commands received from information processing apparatuses 200. For example, when requests to input and output data are received from a information processing apparatus 200, the storage device controlling apparatus 100 performs processing for the input and output of data stored in a storage device 300. Data is stored in a memory area, a logical unit (hereinafter, referred to as LU) logically set in a physical memory area provided by the disk drive of the storage device 300. The storage device controlling apparatus 100 also receives various commands from the information processing apparatuses 200 to manage the storage system 600.

The information processing apparatus 200 is a computer having a CPU. (Central Processing Unit) and a memory. Execution of various programs by the CPU provided in the information processing apparatus 200 implements various functions. The information processing apparatus 200 is, for example, a personal computer, a workstation or a mainframe computer.

In FIG. 1, the information processing apparatuses 1 to 3 (200) are connected to the storage device controlling apparatus 100 via a LAN (Local Area Network) 400. The LAN 400 may be the Internet or an exclusive network. Communication between the information processing apparatuses 1 to 3 (200) and the storage device controlling apparatus 100 is performed via the LAN 400 according to, for example, TCP/IP protocols. The information processing apparatuses 1 to 3 (200) send the storage system 600 data access requests with specified file names (requests to input and output data in terms of files; hereinafter referred to as file access requests).

The LAN 400 is connected to a backup device 910, which is specifically a disk-based device such as MO, CD-R or DVD-RAM, or a tape-based device such as a DAT tape, cassette tape, open tape or cartridge tape. The backup device 910 communicates with the storage device controlling apparatus 100 via the LAN 400 to store backup data for data stored in the storage device 300. Further, the backup device 910 can also be connected to the information processing apparatus 1 (200). In this case, backup data for data stored in the storage device 300 is acquired via the information processing apparatus 1 (200).

The storage device controlling apparatus 100 comprises channel controllers 1 to 4 (110). By the channel controllers 1 to 4 (110), the storage device controlling apparatus 100 communicates with the information processing apparatuses 1 to 3 (200) and the backup device 910 via the LAN 400. The channel controllers 1 to 4 (110) individually accept file access requests from the information processing apparatuses 1 to 3 (200). That is, the channel controllers 1 to 4 (110) are assigned respective network addresses on the LAN 400 (e.g., IP addresses), and each behaves as a NAS so that each channel controller can provide service as NAS to the information processing apparatuses 1 to 3 (200) as if separate NASs were present. Hereinafter, the channel controllers 1 to 4 (110) are each referred to as CHN. Thus, one storage system 600 is constructed to have the channel controllers 1 to 4 (110), which individually provide service as the NAS, and thereby NAS servers, which are operated individually on separate computers in the conventional art, are integrated into one storage system 600. Therefore, the entire storage system 600 can be managed so that various settings and controls, and maintenance such as fault management and version management are made more efficient.

Note that the functions of the channel controllers 1 to 4 (110) of the storage device controlling apparatus 100 according to the present embodiment are implemented by hardware formed on an integrally unitized circuit board and software such as an operating system (hereinafter, referred to as OS) executed by this hardware and application programs running on this OS, as described later. Thus, the functions of the storage system 600 according to the present embodiment, which are implemented as part of hardware in the conventional art, are implemented mainly by software. Hence, the storage system 600 according to the present embodiment enables flexible system operation and can provide more finely tuned services to meet diverse and greatly varying user needs.

The information processing apparatuses 3, 4 (200) are connected to the storage device controlling apparatus 100 via a SAN (Storage Area Network) 500. The SAN 500 is a network for the storage device controlling apparatus 100 to exchange data with the information processing apparatuses 3, 4 (200) in blocks, units for managing data in the memory area provided by the storage device 300. The communication between the information processing apparatuses 3, 4 (200) and the storage device controlling apparatus 100 via the SAN 500 is performed usually according to a Fibre-Channel protocol. The information processing apparatuses 3, 4 (200) send requests to access data (hereinafter, referred to as block access requests) to the storage system 600 in blocks according to the Fibre-Channel protocol.

The SAN 500 is connected to a backup device 900 compatible with SAN, which communicates with the storage device controlling apparatus 100 via the SAN 500 to store backup data for data stored in the storage device 300.

The storage device controlling apparatus 100 comprises channel controllers 5, 6 (110). By the channel controllers 5, 6 (110), the storage device controlling apparatus 100 communicates with the information processing apparatuses 3, 4 (200) and the backup device 900 compatible with SAN via the SAN 500. Hereinafter, the channel controllers 5, 6 (110) are referred to as CHFs.

The information processing apparatus 5 (200) is connected to the storage device controlling apparatus 100 directly without a network such as the LAN 400 and the SAN 500. The information processing apparatus 5 (200) may be, for example, a mainframe computer. The communication between the information processing apparatus 5 (200) and the storage device controlling apparatus 100 is performed according to a communication protocol such as FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark). The information processing apparatus 5 (200) sends the storage system 600 block access requests according to the communication protocol.

The storage device controlling apparatus 100 communicates with the information processing apparatus 5 (200) by the channel controllers 7, 8 (110). Hereinafter, the channel controllers 7, 8 (110) are referred to as CHAs.

The SAN 500 is connected to another storage system 610 installed at a place (secondary site) remote from the place (primary site) where the storage system 600 is installed. The storage system 610 is used as a unit into which data is duplicated by a function of undermentioned remote copy or replication. It is noted that the storage system 610 may also be connected to the storage system 600 via a communication line such as ATM, instead of the SAN 500. In this case, a channel controller 110 provided with an interface (channel extender) for using the abovementioned communication line is adopted.

According to the present embodiment, by installing CHNs 110, CHFs 110, and CHAs 110 together in the storage system 600, a storage system connected to different types of networks can be implemented. Specifically, the storage system 600 is a SAN-NAS integrated storage system, which is connected to the LAN 400 via CHNs 110 and to the SAN 500 via CHFs 110.

Storage Device

The storage device 300 comprises multiple disk drives (physical disks) and provides a memory area to the information processing apparatus 200. Data is stored in an LU, a memory area logically set on a physical memory area provided by the disk drive. Various units such as a hard disk unit, a flexible disk unit and a semiconductor memory unit can be used as the disk drive.

Note that the storage device 300 can be, for example, a disk array formed of a plurality of disk drives. In this case, the memory area may be provided to the information processing apparatus 200 by the plurality of disk drives managed by a RAID.

The storage device controlling apparatus 100 and the storage devices 300 may be connected directly as shown in FIG. 1 or via a network. Alternatively, the storage devices 300 may be integrated with the storage device controlling apparatus 100.

LUs set in the storage device 300 include user LUs accessible from the information processing apparatuses 200, a system LU used for controlling a channel controller 110, and the like. Stored in the system LU is an operating system executed in a CHN 110. Each LU is made correspond to a channel controller 110, and thereby each channel controller 110 is assigned accessible LUs. In the correspondence, a plurality of channel controllers 110 can share one LU. Hereinafter, the user LU and the system LU are also referred to as a user disk and a system disk, respectively. An LU shared by a plurality of channel controllers 110 is referred to as a shared LU or a shared disk.

Storage Device Controlling Apparatus

The storage device controlling apparatus 100 comprises the channel controllers 110, a shared memory 120, a cache memory 130, disk controllers 140, a managing terminal 160, and a connecting section 150.

The channel controller 110 comprises a communication interface to communicate with the information processing apparatuses 200 and a function to receive data input and output commands, etc., with the information processing apparatuses 200. For example, the CHNs 110 accept file access requests from the information processing apparatuses 1 to 3 (200) and obtain the memory addresses and data lengths of the files to output I/O requests corresponding to the file access requests so as to access storage devices 300. Accordingly, the storage system 600 can provide service as a NAS to the information processing apparatuses 1 to 3 (200). Note that the I/O request includes the top address, data length, and type of access such as read or write, of data. When data is to be written, the I/O request may include data to be written. I/O requests are outputted by an I/O processor 119 described later. The CHFs 110 accept block access requests from the information processing apparatuses 3, 4 (200) according to the Fibre-Channel protocol. Thus, the storage system 600 can provide high-speed accessible data storage service to the information processing apparatuses 3, 4 (200). The CHAS 110 accept block access requests from the information processing apparatus 5 (200) according to a protocol such as FICON, ESCON, ACONARC, or FIBARC. Accordingly, the storage system 600 can provide data storage service to the information processing apparatus 5, a mainframe computer.

The channel controllers 110 and the managing terminal 160 are connected by an internal LAN 151. Accordingly, micro-programs, etc., executed by the channel controllers 110 can be sent from the managing terminal 160 and installed therein. The construction of the channel controllers 110 is described later.

The connecting section 150 connects the channel controllers 110, the shared memory 120, the cache memory 130, and the disk controllers 140. Data and commands are sent and received to and from the channel controllers 110, the shared memory 120, the cache memory 130, and the disk controllers 140 via the connecting section 150. The connecting section 150 is, for example, a high-speed bus such as a superfast cross bus switch which transmits data by high-speed switching. Since the channel controllers 110 are connected each other by the high-speed bus, the communication performance between the channel controllers 110 is greatly improved over the conventional construction where the NAS servers operating on individual computers are connected via a LAN. This enables a high-speed file sharing function, high-speed fail-over, and the like.

The shared memory 120 and the cache memory 130 are memories shared by the channel controllers 110 and the disk controllers 140. The shared memory 120 is mainly used to store control information, commands, etc., while the cache memory 130 is mainly used to store data.

For example, when a data input and output command received by a channel controller 110 from an information processing apparatus 200 is a write command, the channel controller 110 writes the write command into the shared memory 120 and data received from the information processing apparatus 200 into the cache memory 130. Meanwhile, the disk controllers 140 are monitoring the shared memory 120. When the disk controllers 140 detect that the write command has been written into the shared memory 120, one of the disk controllers 140 reads the data from the cache memory 130 and writes the data into a relevant storage device 300 according to the command.

When a data input and output command received by a channel controller 110 from an information processing apparatus 200 is a read command, the channel controller 110 writes the read command into the shared memory 120 and checks whether to-be-read data is present in the cache memory 130. If the data is present in the cache memory 130, the channel controller 110 sends the data to the information processing apparatus 200. On the other hand, if the to-be-read data is not present in the cache memory 130, a disk controller 140 monitoring the shared memory 120 detects that the read command has been written into the shared memory 120 and reads the to-be-read data from a relevant storage device 300 to write the data into the cache memory 130 and a notice thereof in the shared memory 120. Thereafter, when the channel controller 110 detects that the to-be-read data has been written into the cache memory 130 by monitoring the shared memory 120, the channel controller 110 sends the data to the information processing apparatus 200.

Note that other than the construction where instructions to write and read data are indirectly sent from the channel controller 110 to the disk controller 140 via the shared memory 120, for example, the storage device controlling apparatus 100 may have construction where instructions to write and read data are sent directly from a channel controller 110 to a disk controller 140 without the shared memory 120.

A disk controller 140 controls a storage device 300. For example, as described above, according to a data write command received from an information processing apparatus 200, a channel controller 110 writes the data into the storage device 300. Further, a request sent from the channel controller 110 to access data in an LU designated by a logical address is converted into a request to access data in a physical disk designated by a physical address. If the physical disks in the storage device 300 are managed by RAID, data is accessed according to the structure of the RAID. Moreover, the disk controller 140 controls management of the duplication and backup of data stored in the storage device 300. Furthermore, the disk controller 140 controls to store duplication of data in the storage system 600 at the primary site into another storage system 610 installed in the secondary site (a replication or remote copy function) for the purpose of preventing data loss in the occurrence of disaster (disaster recovery).

The disk controllers 140 and the managing terminal 160 are connected each other via the internal LAN 151 and can communicate with each other. This enables micro-programs, etc., executed by the disk controllers 140 to be sent from the managing terminal 160 and installed therein. The construction of the disk controllers 140 is described later. In the present embodiment, the shared memory 120 and the cache memory 130 are provided separately from the channel controllers 110 and the disk controllers 140. The present embodiment is not limited to this case. It is also preferable that the shared memory 120 or the cache memory 130 be dispersed to be provided in each of the channel controllers 110 and the disk controllers 140. In this case, the connecting section 150 connects the channel controllers 110 and the disk controllers 140, which have dispersed shared memories or cache memories.

Managing Terminal

The managing terminal 160 is a computer for maintaining and managing the storage system 600. By operating the managing terminal 160, it is possible to set the structure of the physical disks and LUs in the storage device 300 and install micro-programs executed by the channel controllers 110. Herein, in the setting of the structure of the physical disks in the storage device 300, for example, physical disks can be added or removed, and the RAID structure can be changed (e.g., a change from RAID1 to RAID5). Further, via the managing terminal 160, it is possible to perform various operations, including: confirming the operation state of the storage system 600; identifying a fault section; and installing operating systems executed by the channel controllers 110. Yet further, the managing terminal 160 is connected to an external maintenance center via a LAN, a telephone line, etc., so that it is possible to monitor faults in the storage system 600 and quickly deals with faults when occurred by use of the managing terminal 160. The occurrence of faults is notified by, for example, OSs, application programs, driver software, etc. The faults are notified through a HTTP protocol, a SNMP (Simple Network Management Protocol), e-mails and the like. These are set and controlled by an operator and the like via a Web page serving as a user interface provided by a Web server operating on the managing terminal 160. The operator and the like can also designate objects subjected to fault monitoring and set its contents and targets to be notified of faults.

The managing terminal 160 can be incorporated into the storage device controlling apparatus 100 or attached thereto externally. Further, the managing terminal 160 may be a computer which exclusively maintains and manages the storage device controlling apparatus 100 and the storage devices 300 or a general-purpose computer having a maintenance and management function.

Figures 2, 3, 4:
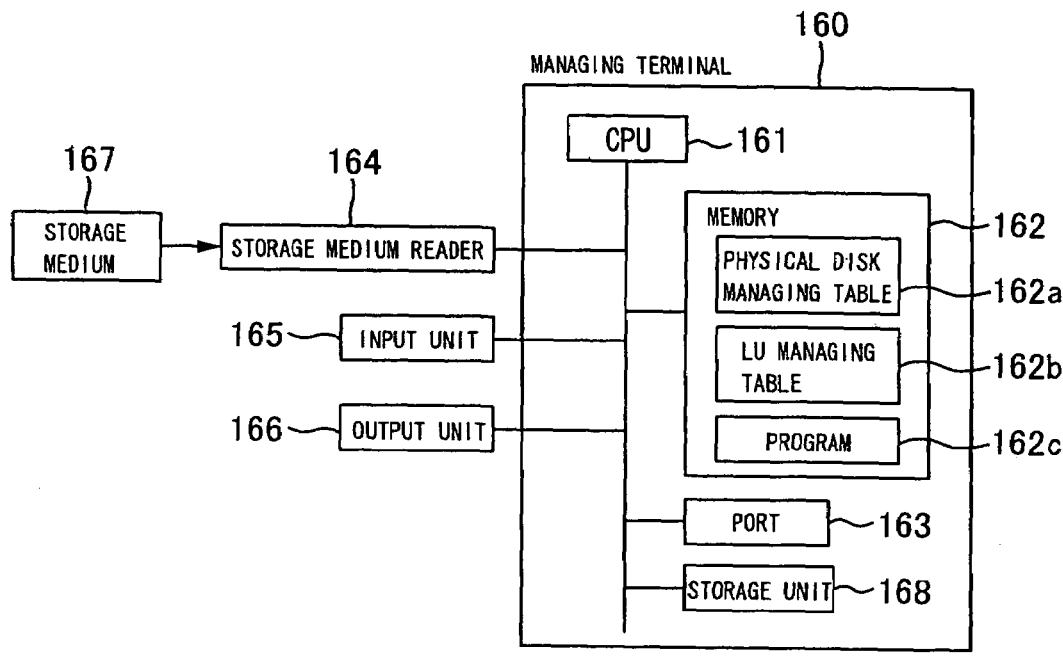
FIG. 2 is a block diagram showing the construction of a managing terminal according to the present embodiment.
FIG. 3 is a view showing a physical disk managing table according to the present embodiment.
FIG. 4 is a view showing a LU managing table according to the present embodiment.

FIG. 2 is a block diagram showing the construction of the managing terminal 160.

The managing terminal 160 comprises a CPU 161, a memory 162, a port 163, a storage medium reader 164, an input unit 165, an output unit 166, and a storage unit 168.

The CPU 161 controls the whole managing terminal 160 and implements functions and the like as the abovementioned Web server, etc., by executing a program 162c stored in the memory 162. The memory 162 stores a physical disk managing table 162a, an LU managing table 162b, and the program 162c.

The physical disk managing table 162a is a table for managing the physical disks (disk drives) provided in a storage device/storage devices 300, and is shown in FIG. 3. In FIG. 3, of the multiple physical disks provided in the storage device/storage devices 300, disk numbers #001 to #006 are shown. The capacity, RAID structure, and usage state of each physical disk are shown.

The LU managing table 162b is a table for managing the LUs set logically on the abovementioned physical disks, and is shown in FIG. 4. In FIG. 4, of the multiple LUs set in the storage device 300, LU numbers #1 to #3 are shown. The physical disk number, capacity, and RAID structure of each LU are shown.

The storage medium reader 164 is a unit for reading programs and data stored in a storage medium 167. Read programs and data are stored in the memory 162 or the storage unit 168. Accordingly, for example, the program 162c recorded in the storage medium 167 can be read by use of the storage medium reader 164 and stored in the memory 162 or the storage unit 168. A flexible disk, a CD-ROM, a DVD-ROM, a DVD-RAM, a semiconductor memory, etc., can be used as the storage medium 167. Note that a program for installing the OS 701 and application programs on the channel controllers 110 and disk controllers 140, and an upgrade program can be used as the program 162c, in addition to the program for operating the managing terminal 160.

The storage medium reader 164 can be incorporated into the managing terminal 160 or attached thereto externally. The storage unit 168 is, for example, a hard disk unit, flexible disk unit, and a semiconductor memory unit. The input unit 165 is used by an operator, etc., to enter data, etc., into the managing terminal 160. Used as the input unit 165 is, for example, a keyboard, or a mouse. The output unit 166 is a unit for outputting information to the outside. Used as the output unit 166 is, for example, a display, or a printer. The port 163 is connected to the internal LAN 151, and thereby the managing terminal 160 can communicate with the channel controllers 110, the disk controllers 140 and the like. Further, the port 163 can be connected to the LAN 400 or a telephone line.

Exterior Figure

Figure 5:
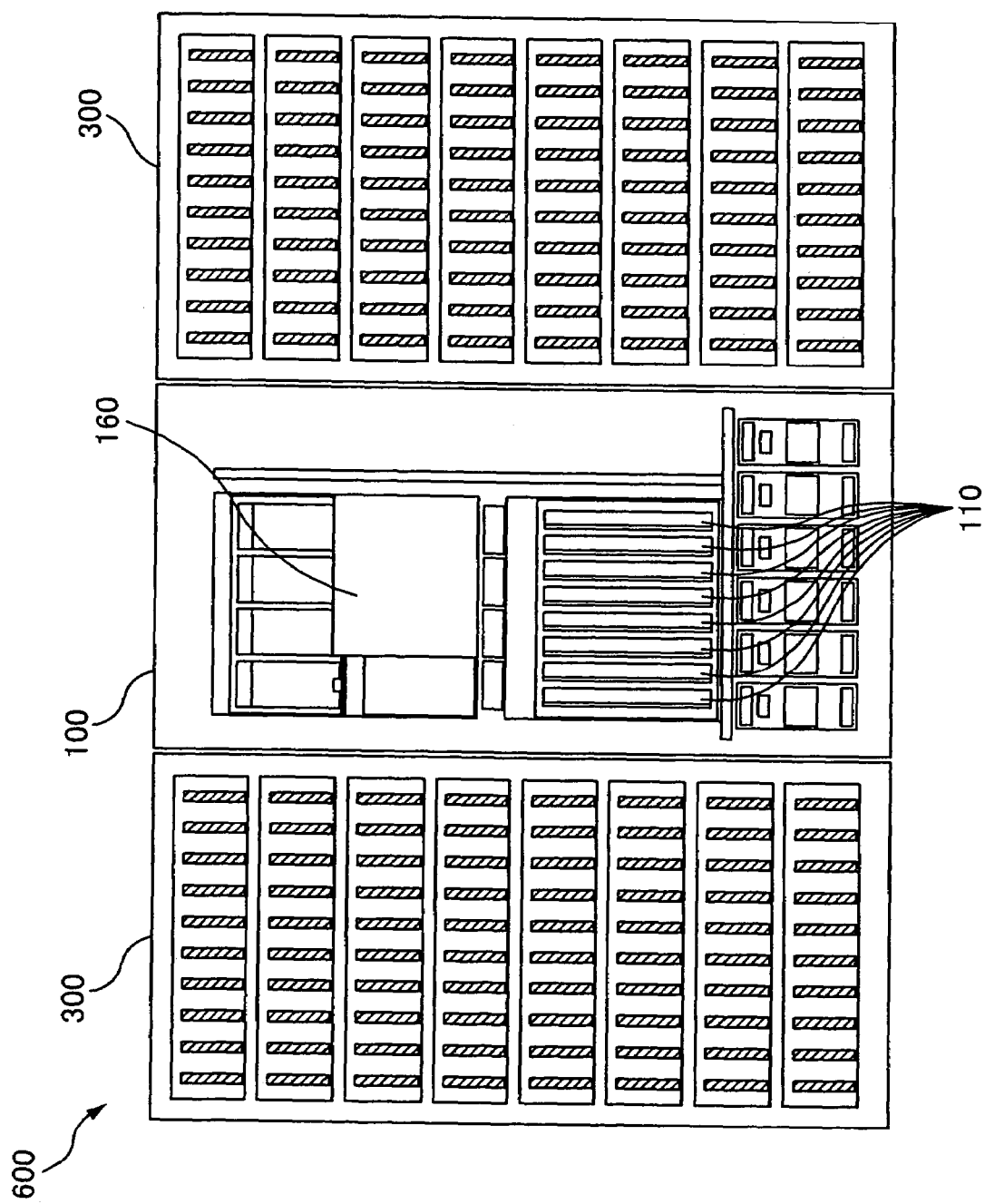
FIG. 5 is a view showing the exterior structure of the storage system according to the present embodiment.
Figure 6:
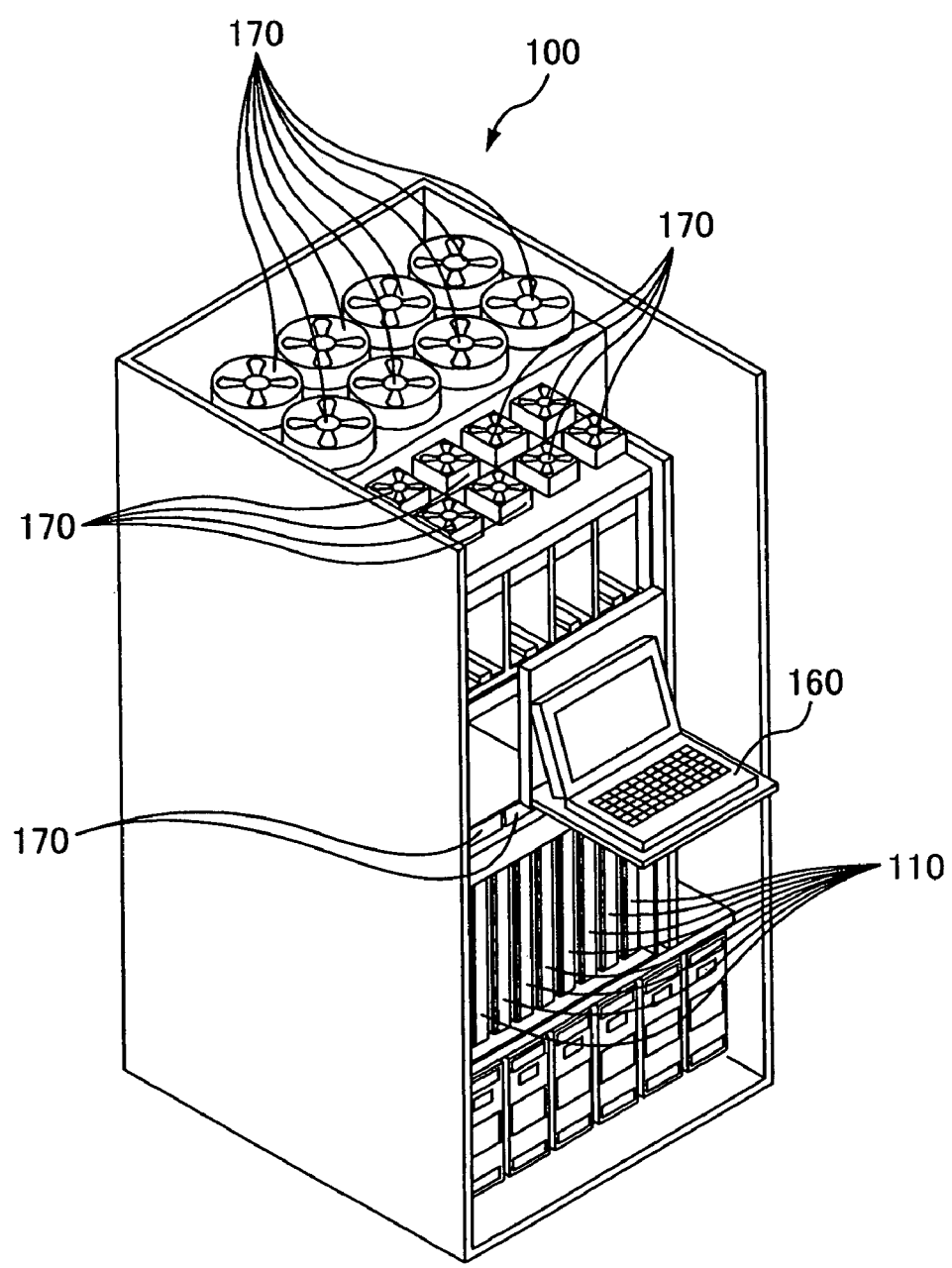
FIG. 6 is a view showing the exterior structure of the storage device controlling apparatus according to the present embodiment.

Next, FIG. 5 shows the exterior structure of the storage system 600 according to the present embodiment, and FIG. 6 shows the exterior structure of the storage device controlling apparatus 100.

As shown in FIG. 5, the storage system 600 according to the present embodiment has the storage device controlling apparatus 100 and the storage devices 300 contained in respective chassis. The chassis for the storage devices 300 are placed on both sides of the chassis for the storage device controlling apparatus 100.

The storage device controlling apparatus 100 comprises the managing terminal 160 provided at the center front. The managing terminal 160 is covered by a cover, and the managing terminal 160 can be used by opening the cover as shown in FIG. 6. Note that while the managing terminal 160 shown in FIG. 6 is a so-called notebook personal computer, it may take any form.

Provided under the managing terminal 160 are slots to which the boards of the channel controllers 110 are to be attached. The board of a channel controller 110 is a unit in which a circuit board of the channel controller 110 is formed, and is an attachment unit to the slots. The storage system 600 according to the present embodiment has eight slots. FIGS. 5 and 6 show a state where the eight slots have the boards of the channel controllers 110 attached thereto. Each slot is provided with guide rails to attach a board of a channel controller 110. By inserting the board of the channel controller 110 into the slot along the guide rails, the board of the channel controller 110 is attached to the storage device controlling apparatus 100. By pulling the board of the channel controller 110 toward the front along the guide rails, the channel controller 110 can be removed. Further, provided on the surface facing forwards in the back of each slot is a connector for connecting a board of a channel controller 110 to the storage device controlling apparatus 100 electrically. The channel controllers 110 are CHNs, CHFS, and CHAs. Since each board of the channel controllers 110 is compatible with the others in size and in the position and pin arrangement of its connector and the like, the eight slots can have any board of the channel controllers 110 attached thereto. Therefore, for example, all the eight slots can have the boards of the. CHNs 110 attached thereto. Alternatively, as shown in FIG. 1, the eight slots can have four CHNs 110, two CHFs 110, and two CHAs 110 attached thereto, or some of the slots may have no channel controller 110.

Figure 12:
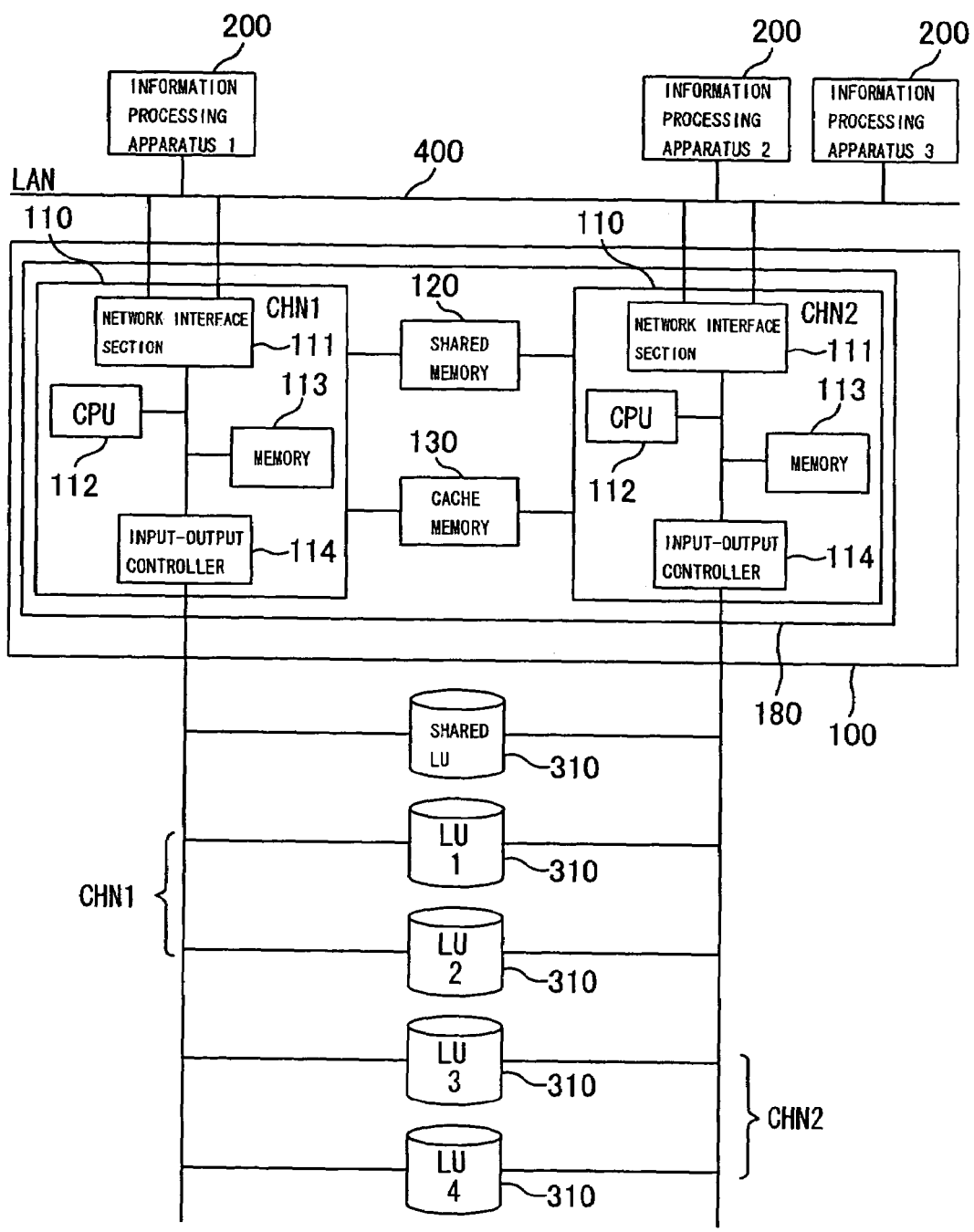
FIG. 12 is a view showing the structure of a cluster in channel controllers according to the present embodiment.

Of the channel controllers 110 attached to the slots, plural channel controllers 110 of the same type constitute a cluster. For example, two CHNs 110 as a pair may constitute a cluster. By constituting a cluster, even when a fault has occurred in a channel controller 110 of the cluster, another channel controller 110 in the cluster may be arranged to take over processing that the channel controller 110, where the fault has occurred, was performing until then (fail-over control). FIG. 12 shows two CHNs 110 constituting a cluster, which is described in detail later.

Note that the storage device controlling apparatus 100 has two systems of power supply to improve reliability, and the abovementioned eight slots, to which channel controllers 110 are attached, are divided into two groups of four for the respective power supply systems. Hence, when forming a cluster, the cluster is arranged to include channel controllers 110 respectively connected to both power supply systems. Thus, even if a failure occurs in one of the power supply systems to stop supplying electric power, electric power continues to be supplied to a board of another channel controller 110 connected to the other power supply system forming part of the same cluster. Therefore, another channel controller 110 can take over the processing from the relevant channel controller 110 (fail-over).

Note that, as described above, while each channel controller 110 is provided as a board that can be attached to any of the slots, the board may include a plurality of circuit boards formed integrally.

Other units forming part of the storage device controlling apparatus 100, such as the disk controllers 140 and the shared memory 120, are not shown in FIGS. 5 and 6, but attached to the back, etc., of the storage device controlling apparatus 100.

The storage device controlling apparatus 100 is provided with fans 170 for releasing heat generated by the boards of the channel controllers 110, etc. The fans 170 are provided on the tops of the slots for the channel controllers 110 as well as on the top of the storage device controlling apparatus 100.

For example, units having conventional structures that are manufactured complying with a SAN can be used as the storage device controlling apparatus 100 and the storage devices 300 contained in respective chassis. In particular, by making the connector's shape of the board of the CHN take such a shape that it can be directly attached to a slot provided in a conventionally structured chassis as described above, the units having conventional structures can be used more easily. The storage system 600 according to the present embodiment can be easily constructed by using the existing products.

Channel Controller

As described above, the storage system 600 according to the present embodiment accepts file access requests from the information processing apparatuses 1 to 3 (200) by CHNs 110, and provides service as a NAS to the information processing apparatuses 1 to 3 (200).

Figure 7:
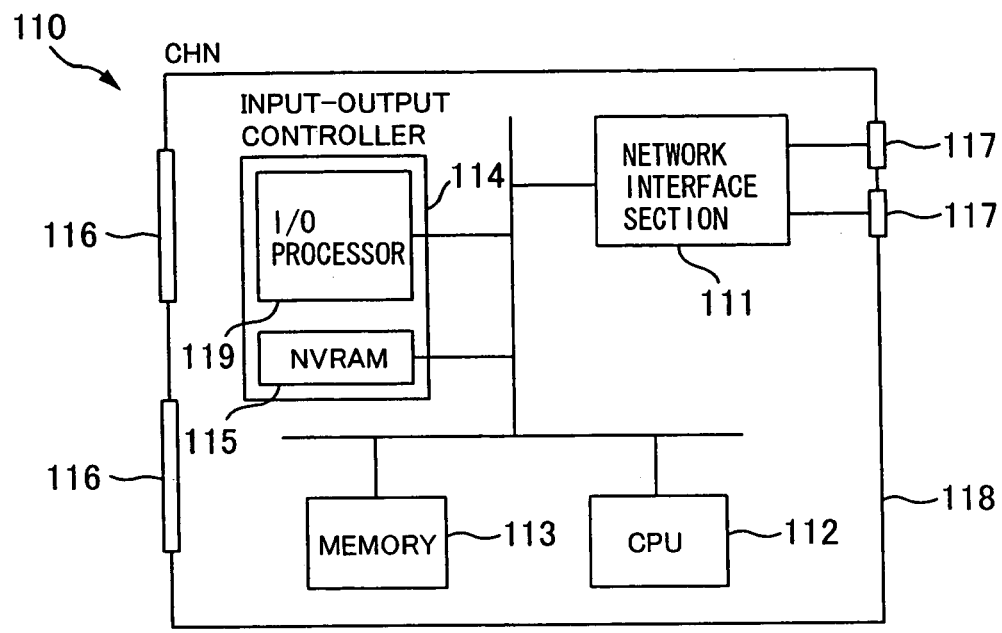
FIG. 7 is a view showing a CHN according to the present embodiment.

The hardware structure of a CHN 110 is shown in FIG. 7. As shown in FIG. 7, the CHN 110's hardware is constituted by a board integrally unitized. Hereinafter, this board is referred to as a NAS board. The NAS board includes one or more circuit boards. More specifically, the NAS board comprises a network interface section 111, a CPU 112, a memory 113, an input-output controller 114, an I/O (Input/Output) processor 119, an NVRAM (Non Volatile RAM) 115, a board connecting connector 116, and a communication connector 117, which are formed as one unit.

The network interface section 111 comprises a communication interface for communicating with the information processing apparatuses 200. In the case of a CHN 110, the communication interface receives file access requests sent from the information processing apparatuses 200 according to, for example, TCP/IP protocols. The communication connector 117 is a connector for communicating with the information processing apparatuses 200. In the case of a CHN 110, the communication connector is a connector that can be connected to the LAN 400 and complies with, for example, Ethernet (registered trademark).

The CPU 112 controls the CHN 110 to function as a NAS board.

Figure 9:
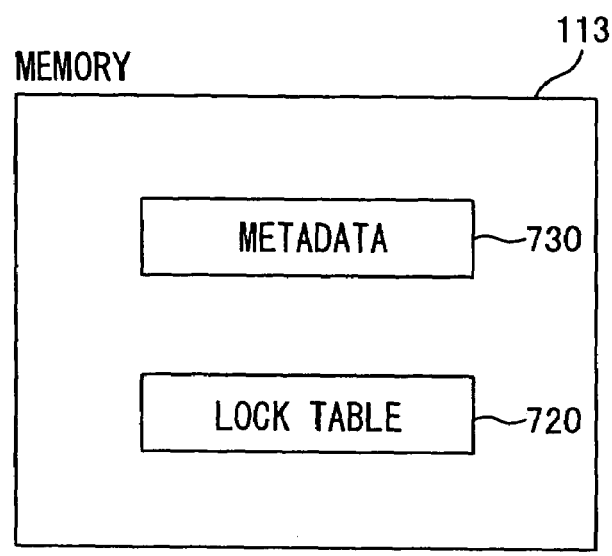
FIG. 9 is a view for explaining the contents of data stored in a memory according to the present embodiment.
Figure 11:
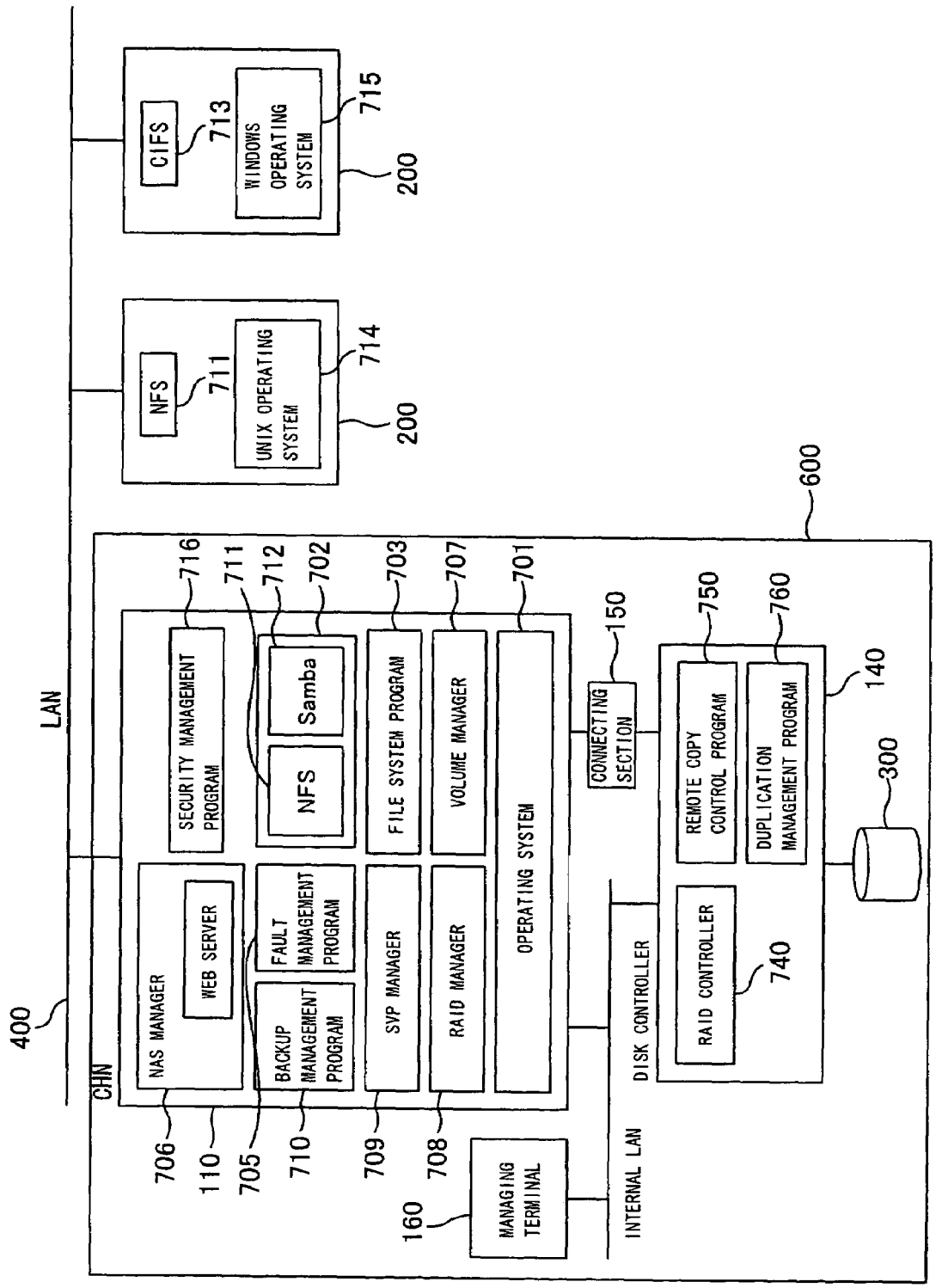
FIG. 11 is a view showing the structure of software according to the present embodiment.

The memory 113 stores various programs and data. For example, metadata 730 and a lock table 720 shown in FIG. 9 and various programs such as a NAS manager 706 shown in FIG. 11 are stored.

The metadata 730 is information created for files managed by a file system implemented by a file system program 703 or the like. The metadata 730 includes information for identifying the storage location of each file such as the address on an LU where the file data is stored and the data size. The metadata 730 includes information on the correspondence between the names of the files managed by the file system and address information (e.g., top address) for identifying the locations of the data, which corresponds to the files, stored on an LU. The metadata 730 may also include the capacity, owner, update time, etc., of each file. Further, the metadata 730 may be created not only for files but also for directories. An example of the metadata 730 is shown in FIG. 13. The metadata 730 is also stored in each LU in the storage device 300.

Figure 14:
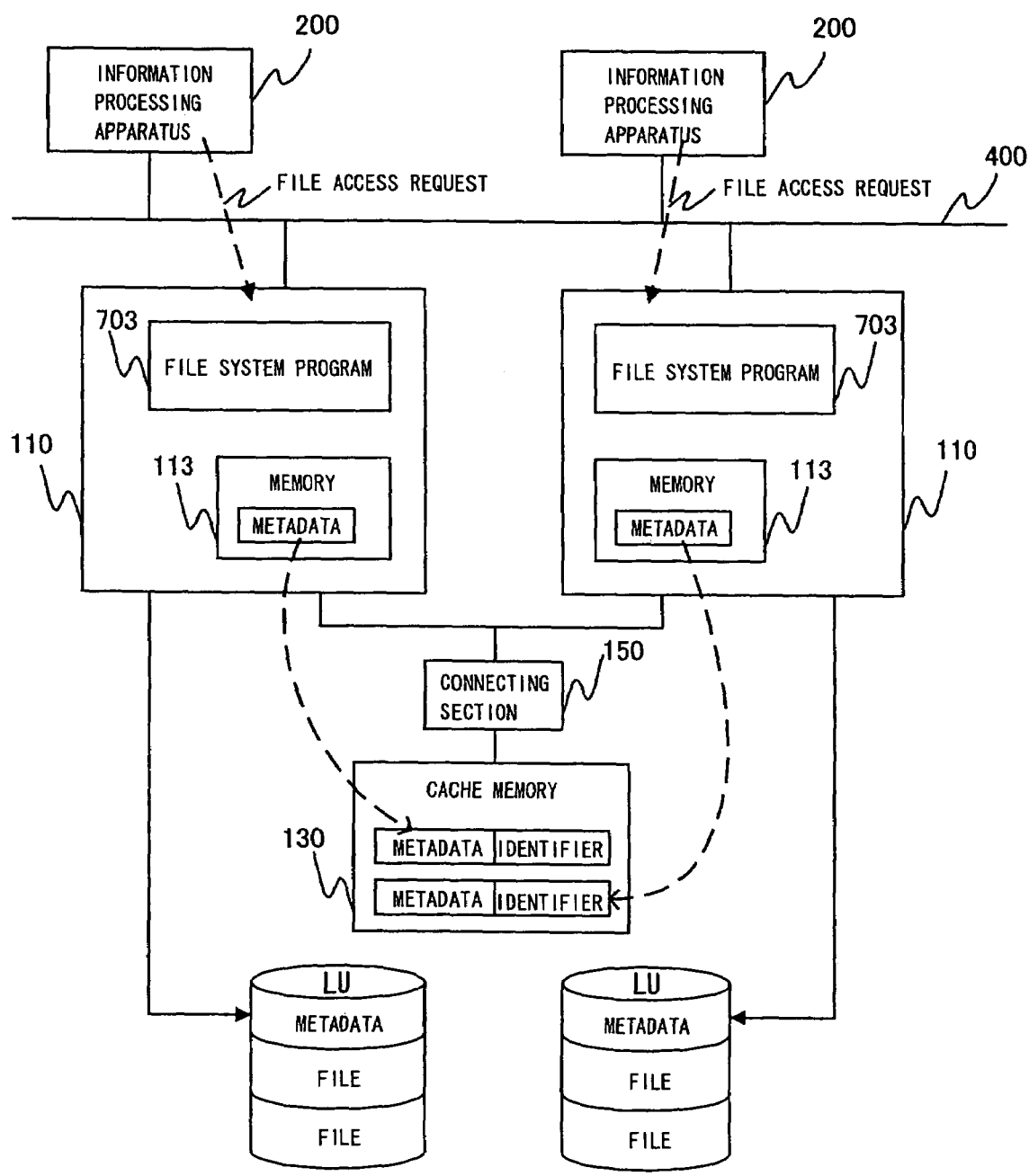
FIG. 14 is a view explaining how the CHN identifies an address on an LU corresponding to a file name set in a file access request, according to the present embodiment.

When a file access request is made from an information processing apparatus 200 to a CHN 110, the CHN 110 searches the metadata 730 for the name of the file specified in the file access request to be accessed and identifies the address on an LU in which the file is stored. FIG. 14 illustrates how a CHN 110 identifies the address on an LU for the file specified in the file access request. In the identification, the metadata 730 stored in the memory 113 of the CHN 110 is referenced. Note that data stored in the memory 113 of the CHN 110 may be controlled to be written out to the cache memory 130 according to FIFO (First In First Out) rule, etc., in order to use the memory 113 efficiently. Herein, during this control, groups of metadata 730 written from a plurality of the CHNs 110 may coexist in the cache memory 130. Therefore, identifiers are given to the groups of the metadata 730 stored in the cache memory 130 to identify the CHN 110 where the data is written out from. When the CHN 110 writes relevant metadata 730 stored in the cache memory 130 back into its own memory 113, the metadata is written back if the CHN 110 confirms that the identifier thereof matches the metadata's identifier.

The lock table 720 is a table for performing exclusive control on file accesses from the information processing apparatuses 1 to 3 (200). With exclusive access control, the information processing apparatuses 1 to 3 (200) can share files. The lock table 720 is shown in FIG. 15. As shown in the drawing, the lock table 720 includes a file lock table 721 and an LU lock table 722. The file lock table 721 is a table for indicating whether it is locked for each file. When an information processing apparatus 200 has opened a file, the file is locked, to which access from other information processing apparatuses 200 is prohibited. The LU lock table 722 is a table for indicating whether it is locked for each LU. When an information processing apparatus 200 is accessing an LU, the LU is locked, to which access from other information processing apparatuses 200 is prohibited.

The input-output controller 114 sends and receives data and commands to and from the disk controllers 140, the cache memory 130, the shared memory 120, and the managing terminal 160. The input-output controller 114 comprises the I/O processor 119 and the NVRAM 115. The I/O processor 119 is constituted by, for example, a one-chip micro-computer. The I/O processor 119 controls the sending and receiving of data and commands and relays communication between a CPU 112 and the disk controllers 140. The NVRAM 115 is a nonvolatile memory storing a program to control the I/O processor 119. The contents of a program stored in the NVRAM 115 can be written or rewritten according to instructions from the managing terminal 160 or the NAS manager 706 described later.

Figure 8:
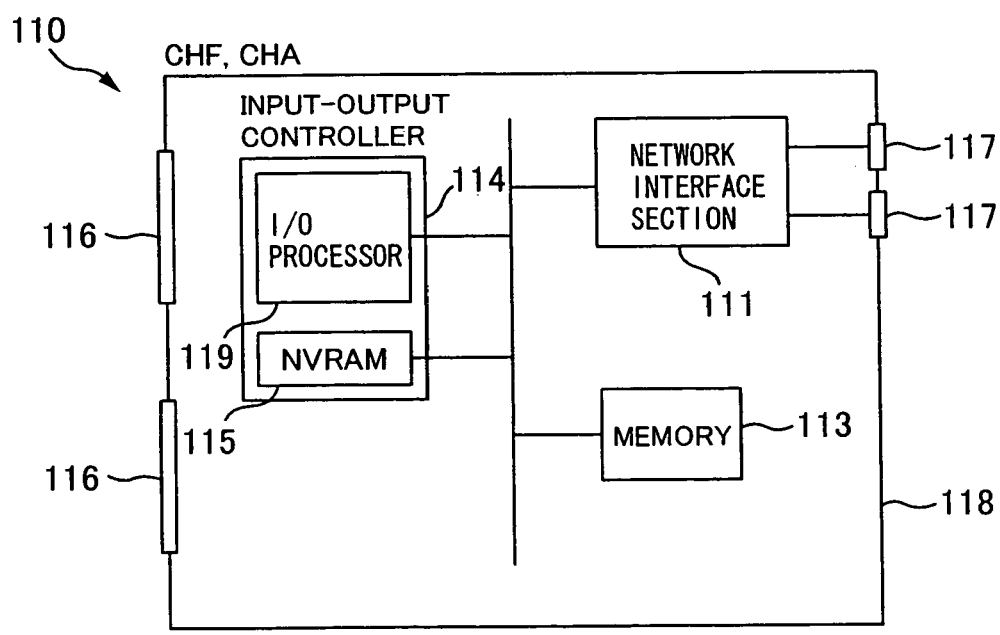
FIG. 8 is a view showing a CHF and CHA according to the present embodiment.

Next, the structures of the CHF 110 and the CHA 110 are shown in FIG. 8. The boards of The CHF 110 and the CHA 110 are also formed as boards integrally unitized in the same way as the CHN 110. Similar to the board of the CHN 110, the board may be constructed from a plurality of circuit boards which are integrally formed. Further, the boards of the CHF 110 and the CHA 110 are compatible with the board of the CHN 110 in terms of size and the position and pin arrangement of the board connecting connector 116 and the like.

The CHF 110 and the CHA 110 comprise a network interface section 111, a memory 113, an input-output controller 114, an I/O processor 119, an NVRAM (Non Volatile RAM) 115, a board connecting connector 116, and a communication connector 117.

The network interface section 111 comprises a communication interface for communicating with the information processing apparatuses 200. In the case of a CHF 110, the communication interface receives block access requests sent from the information processing apparatuses 200 according to, for example, the Fibre Channel protocol. In the case of a CHA 110, the communication interface receives block access requests sent from the information processing apparatuses 200 according to, for example, FICON.(registered trademark), ESCON (registered trademark), ACONARC (registered trademark), or FIBARC (registered trademark) protocol. The communication connector 117 is a connector for communicating with the information processing apparatuses 200. In the case of a CHF 110, the communication connector 117 is a connector that can be connected to the SAN 500 and complies with, for example, the Fibre Channel. In the case of a CHA 110, the communication connector 117 is a connector that can be connected to the information processing apparatus 5 and complies with, for example, FICON (registered trademark), ESCON (registered trademark), ACONARC (registered trademark), or FIBARC (registered trademark).

The input-output controllers 114 control all the CHFs 110 and CHAs 110 and send and receive data and commands to and from the disk controllers 140, the cache memory 130, the shared memory 120, and the managing terminal 160. By executing various programs stored in the memory 113, the functions of the CHFs 110 and CHAs 110 according to the present embodiment are implemented. The input-output controller 114 comprises the I/O processor 119 and the NVRAM 115. The I/O processor 119 controls the sending and receiving of data and commands. The NVRAM 115 is a nonvolatile memory storing a program to control the I/O processor 119. The contents of a program stored in the NVRAM 115 can be written or rewritten according to instructions from the managing terminal 160 or the NAS manager 706 described later.

Figure 10:
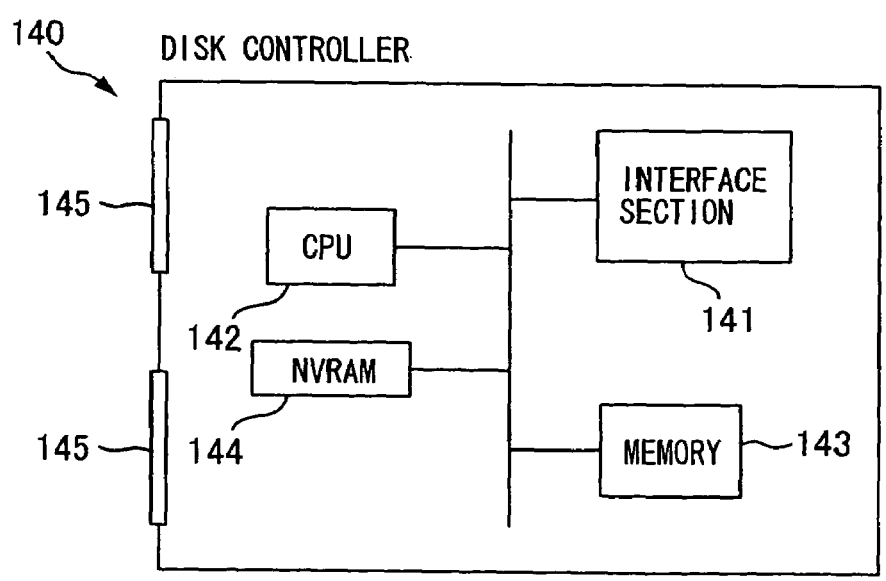
FIG. 10 is a view showing a disk controller according to the present embodiment.

Next, the hardware structure of the disk controllers 140 is shown in FIG. 10.

The disk controller 140 is formed as a board unitized integrally. The board of the disk controller 140 comprises an interface section 141, a memory 143, a CPU 142, an NVRAM 144, and a board connecting connector 145, which are formed as a integrally unitized circuit board.

The interface section 141 comprises a communication interface for communicating with the channel controllers 110, etc., via the connecting section 150, and a communication interface for communicating with the storage device 300.

The CPU 142 controls the entire disk controller 140 and communicates with the channel controllers 110, the storage device 300, and the managing terminal 160. By executing various programs stored in the memory 143 and the NVRAM 144, the functions of the disk controller 140 according to the present embodiment are implemented. The functions implemented by the disk controller 140 are the control of the storage device 300, RAID control, and duplication management, backup control, remote copy control, and the like of data stored in the storage device 300.

The NVRAM 144 is a nonvolatile memory storing a program to control the CPU 142. The contents of a program stored in the NVRAM 144 can be written or rewritten according to instructions from the managing terminal 160 or the NAS manager 706 described later.

The board of the disk controller 140 comprises the board connecting connector 145. By engaging the board connecting connector 145 with the connector on the storage device controlling apparatus 100, the board of the disk controller 140 is connected electrically with the storage device controlling apparatus 100.

Software Structure

Next, the structure of software in the storage system 600 according to present embodiment is shown in FIG. 11.

Running on an operating system 701 is software including a RAID manager 708, a volume manager 707, a SVP manager 709, a file system program 703, a network controller 702, a backup management program 710, a fault management program 705, and an NAS manager 706.

The RAID manager 708 running on the operating system 701 provides functions to set parameters for RAID controllers 740 and to control the RAID controllers 740. The RAID manager 708 accepts parameters and control instructions information from the operating system 701, and other applications and the SVP running on the operating system 701, sets the accepted parameters into a RAID controller 740, and sends the RAID controller 740 control commands corresponding to the control instruction information.

Herein, the set parameters include, for example, parameters for defining storage devices (physical disks) forming a RAID group (specifying RAID group's structure information, stripe size, etc.), a parameter for setting a RAID level (e.g., 0, 1, or 5), and the like. Examples of the control commands which the RAID manager 708 sends to a RAID controller 740 are commands instructing to configure and delete a RAID and to change the capacity thereof, and a command requesting structure information of each RAID group.

The volume manager 707 provides virtualized logical volumes, into which LUs provided by the RAID controller 740 are further virtualized, to the file system program 703. A virtualized logical volume is composed of more than one logical volume.

The main function of the file system program 703 is to manage the correspondence between file names designated in file access requests received by the network controller 702 and addresses on virtualized logical volumes in which the files are stored. For example, the file system program 703 identifies the address on a virtualized logical volume corresponding to a file name designated by a file access request.

The network controller 702 comprises two file system protocols, a NFS (Network File System) 711 and a Samba 712. The NFS 711 accepts a file access request from a UNIX (registered trademark)—based information processing apparatus 200 on which the NFS 711 runs. On the other hand, the Samba 712 accepts a file access request from a Windows (registered trademark—based information processing apparatus 200 on which a CIFS (Common Interface File System) 713 runs.

The NAS manager 706 is a program for confirming, setting, and controlling the operation state of the storage system 600. The NAS manager 706 has a function as a Web server and provides a setting Web page for the information processing apparatuses 200 to set and control the storage system 600. The setting Web page is provided by the NAS manager 706 which runs in each of the channel controllers 1 to 4 (110). In response to HTTP (HyperText Transport Protocol) requests from the information processing apparatuses 1 to 3 (200), the NAS manager 706 sends data of the setting Web page to the information processing apparatuses 1 to 3 (200). By use of the setting Web page displayed in the information processing apparatuses 1 to 3 (200), a system administrator, etc., instructs to set and control the storage system 600.

The NAS manager 706 receives data concerning settings and controls sent from an information processing apparatus 200 due to the operation of the setting Web page and performs the settings and controls corresponding to the data. Thus, various settings and controls of the storage system 600 can be performed from the information processing apparatuses 1 to 3 (200). Further, the NAS manager 706 notifies the OS and application programs which run on the channel controllers 110, and disk controllers 140, etc., of the contents of the settings in the setting Web page. The contents set in the setting Web page may be managed by a shared LU 310.

Things that can be done by use of the setting Web page are, for example, LU management and setting (capacity management, capacity expansion and reduction, user assignment, etc.); the setting and control (setting of the addresses of the to-be-copied and the to-be-copied-into) concerning functions such as duplication management and remote copy (replication); the setting and control of the backup management program 710 described later; the management of redundantly structured clusters of CHNS, CHFs and CHAs (setting of the correspondence between the channel controllers, whereby, when one fails, another fails over; a fail-over method; etc.); version management of the OS and application programs running on the OS; and the management and setting of the operation state of a security management program 716 and update management (version management) of the security management program 716 providing functions concerning security of data, such as a virus detection program and virus extermination.

The backup management program 710 is a program for backing up data stored in the storage devices 300 via LAN or SAN. The backup management program 710 provides a function of an NDMP (Network Data Management) protocol and communicates, according to the NDMP, with backup software complying with the NDMP operating on an information processing apparatus 200 via the LAN 400. When a backup device 910 is connected to the information processing apparatus 200 via a SCSI, etc., data to be backed up is once read by the information processing apparatus 200 and sent to the backup device 910. When the backup device 910 is connected to the LAN 400, data to be backed up may be transferred to the backup device 910 from the storage system 600 directly without an information processing apparatus 200.

The fault management program 705 is a program for controlling fail-over between the channel controllers 110 which form a cluster.

FIG. 12 shows a cluster 180 constituted of two CHNs 110. FIG. 12 shows a case where the cluster 180 is composed of a CHN 1 (channel controller 1) 110 and a CHN 2 (channel controller 2) 110.

As previously mentioned, the fail-over processing is performed between the channel controllers 110 constituting the cluster 180. That is, if any fault occurs in CHN 1 (110) and it becomes impossible to continue a processing, the CHN 2 (110) takes over the processing that has been performed by the CHN 1 (110). The fault management program 705 executed by the CHN 1 (110), and the CHN 2 (110) implements the fail-over processing.

Both CHN 1 (110) and CHN 2 (110) execute the fault management program, write in, for example, the shared memory 120 to indicate that the processing thereof is normally performed, and confirm each other whether the other has written. When one cannot detect the writing by the other, the one determines that a fault has occurred in the other and performs fail-over processing. In the fail-over processing, the processing that has been performed by the other is taken over via a shared LU 310.

Fail-over may be automatically performed in this way or manually performed by an operator operating the managing terminal. Alternatively, a user may manually perform failover via an information processing apparatus 200 by use of the setting Web page provided by the NAS manager 706. The manual fail-over operation is performed, for example, when the hardware (e.g. the NAS board) of a channel controller 110 needs to be replaced because of wear, upgrade, periodic diagnosis and the like.

The SVP manager 709 provides the managing terminal 160 with various services according to requests from the managing terminal 160. For example, the SPV manager 709 provides the managing terminal with the contents of various settings concerning the storage system 600 such as the settings of LUs or a RAID, and makes reflected therein the various settings concerning the storage system 600 entered from the managing terminal 160.

The security management program 716 implements functions of detecting computer viruses, monitoring invasion thereof, update management of a computer virus detection program, extermination of viruses infected a computer, firewall, and the like.

Replication Managing Function

A replication managing function is a function that stores a copy of data stored in an LU (hereinafter, referred to as "to-be-copied" LU) in another LU (hereinafter, referred to as a "to-be-copied-into" LU). The replication managing function is implemented by that the CPU 142 of the disk controller 140 executes a replication managing program 760 stored in the NVRAM 144.

Figure 16:
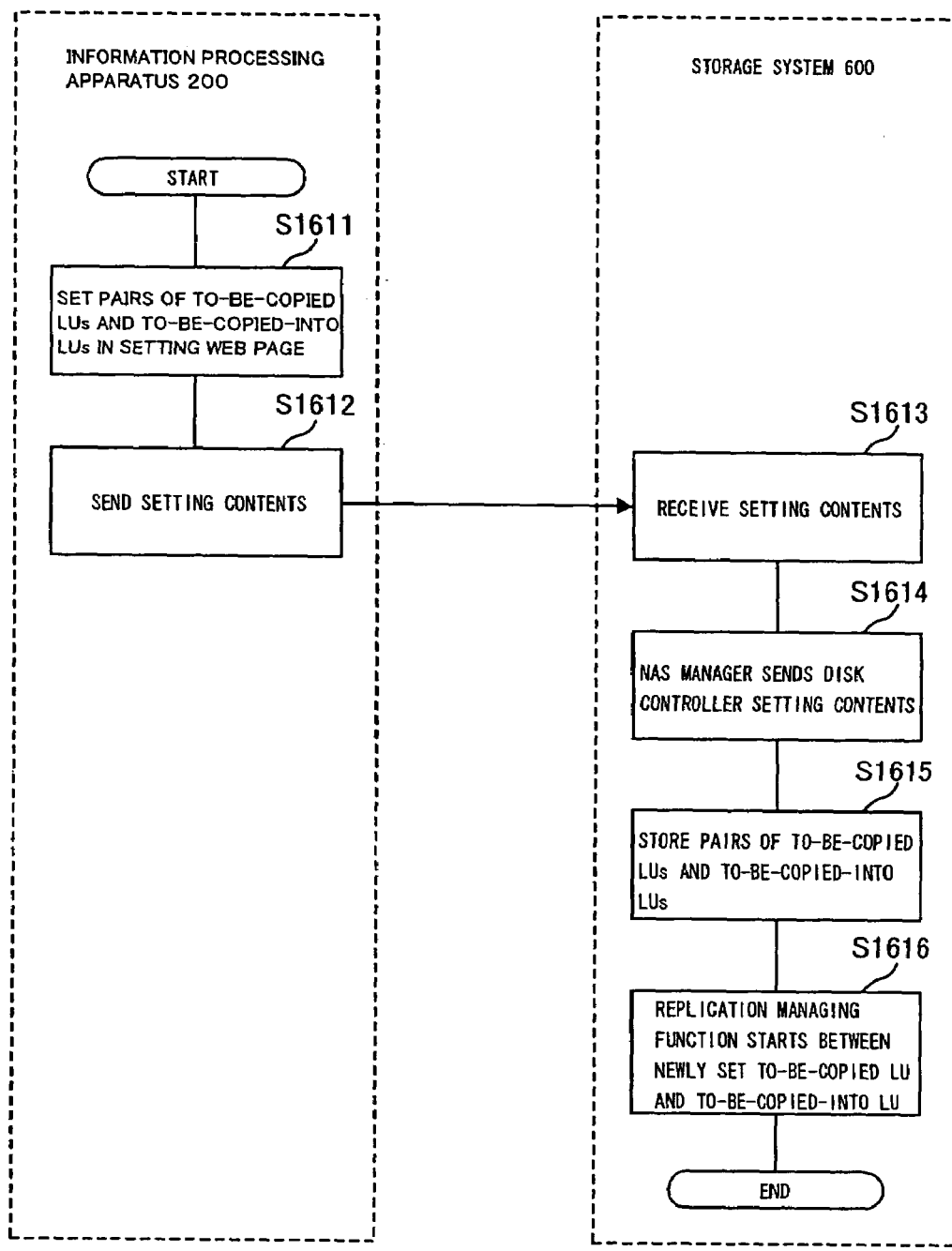
FIG. 16 is a flow chart explaining the process associated with a replication management function according to the present embodiment.

FIG. 16 is a flow chart for explaining the processing associated with the replication managing function. The correspondence between to-be-copied LUs and to-be-copied-into LUs can be set from the information processing apparatus 200 by use of a setting Web page provided by the NAS manager 706. FIG. 17 shows an example of the setting Web page used for setting the correspondence (pairing) between to-be-copied LUs in which data is stored and to-be-copied-into LUs in which a copy of the data is stored. When setting the correspondence, an LUN of a to-be-copied LU in the to-be-copied LU column of this setting Web page 1700 and an LUN of a to-be-copied-into LU in the to-be-copied-into LU column on the right side are set (S1611). Thereafter, the user clicks on the "OK" button, and thereby the setting contents in the setting Web page 1700 are sent to the NAS manager 706 from the information processing apparatus 200 (S1612). The NAS manager 706 receives the setting contents (S1613) and sends the setting contents to a disk controller 140 (S1614). When the disk controller 140 receives and stores the setting contents in the NVRAM 144 (S1615). The replication managing program 760 performs the replication managing function according to the relationship between the to-be-copied LUs and the to-be-copied-into LUs stored in the NVRAM 144. After the above processing, the replication managing function starts to work on between the to-be-copied LU and the to-be-copied-into LU that are newly set (S1616).

Note that, according to instructions from the managing terminal 160 or the NAS manager 706, the control state of the to-be-copied LU and the to-be-copied-into LU can shift between a "pair state" (where the replication managing processing is performed) and a "split state" (where the replication managing processing is suspended). Under the condition where the to-be-copied LU and the to-be-copiedinto LU are in the "pair state," the contents in the to-be-copied-into LU are immediately updated when the contents in the to-be-copied LU are updated. That is, in the "pair state" the identity of data is secured in real time between the to-be-copied LU and the to-be-copied-into LU. Under the condition where the to-be-copied LU and the to-be-copied-into LU are in the "split state," the contents in the to-be-copied-into LU do not immediately reflect the updating even when the contents in the to-be-copied LU are updated. When the "split state" shifts back to the "pair state" again, the to-be-copied-into LU is made to reflect the contents in the to-be-copied LU which have been written during the "split state." Note that data of the differences between the contents in the to-be-copied LU and the contents in the to-be-copied-into LU is managed by the replication managing function during the "split state." Such data of the differences is managed for, e.g., each block or track serving as an area managing unit set on the memory area of the LU.

Figure 19:
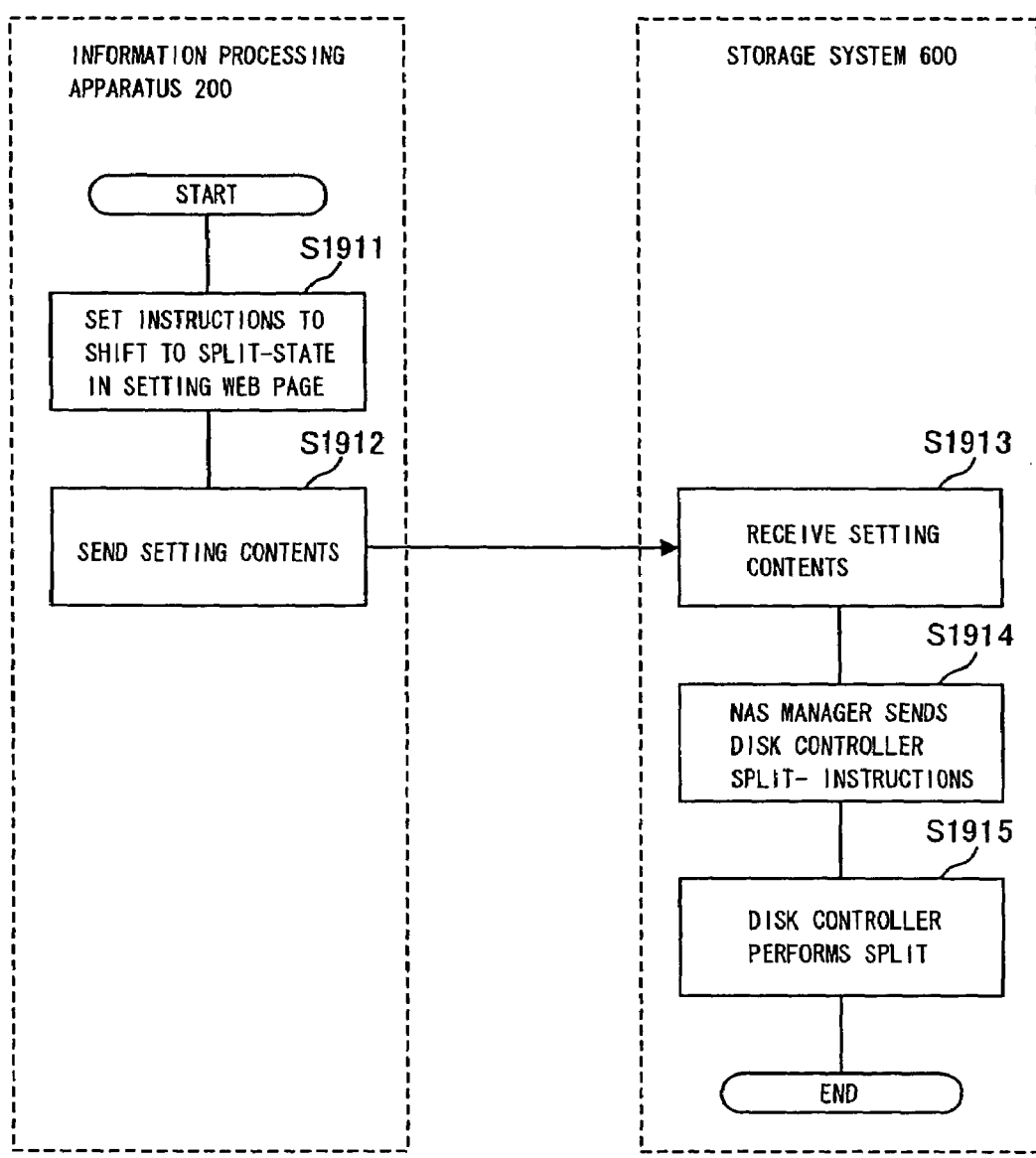
FIG. 19 is a flow chart explaining the process associated with the shift from the "pair state" to the "split state"

FIG. 18 shows an example of a setting Web page used for instructing on a shift from the "pair state" to the "split state." In this setting Web page 1800, the shift can be set for each pair of a to-be-copied LU and a to-be-copied-into LU. The processing associated with the shift from the "pair state" to the "split state" will be described with reference to the flow chart of FIG. 19. To instruct a pair of a to-be-copied LU and a to-be-copied-into LU to shift to the "split state" (where the replication managing function is suspended), "execution" is entered in a split column of the setting Web page of FIG. 1 (S1911). Thereafter, when the user clicks on the "OK" button, a notice is sent to the NAS manager 706 from the information processing apparatus 200 (S1912). The NAS manager 706 which has received the notice (S1913) sends the disk controller 140 a command to instruct to shift to the "split state" (hereinafter called "split instructions") for the pair of the to-be-copied LU and the to-be-copied-into LU for which the change into the "split state" is specified (S1914). When the command is received, the replication managing program 760 running on the disk controller 140 makes the pair of to-be-copied LU and to-be-copied-into LU shift from the "pair state" to the "split state" (S1915).

Note that, by the shift from the "pair state" to the "split state," the contents of the to-be-copied-into LU are maintained invariably from when shifted into the "split state." The "split instructions" are sent, for example, when data is backed up. In other words, by backing up the contents of the to-be-copied-into LU in the "split state," the backup data can be acquired without affecting the to-be-copied LU. Further, the "split instructions" are also sent when the user wants to access the contents of the to-be-copied LU at a certain point in the past. That is, the user can access the contents of the to-be-copied LU at a certain point in the past because the contents of the to-be-copied-into LU are invariably maintained from when shifted into the "split state." Note that the "split instructions" sent for this purpose may be termed "snap shot instructions," and the contents of the to-be-copied LU at a certain point in the past, which are kept in the to-be-copied-into LU, may be termed "snap shot image." By backing up snap shot images at a plurality of points of time as necessary, the contents of the to-be-copied LU can be managed for generations.

Figure 20:
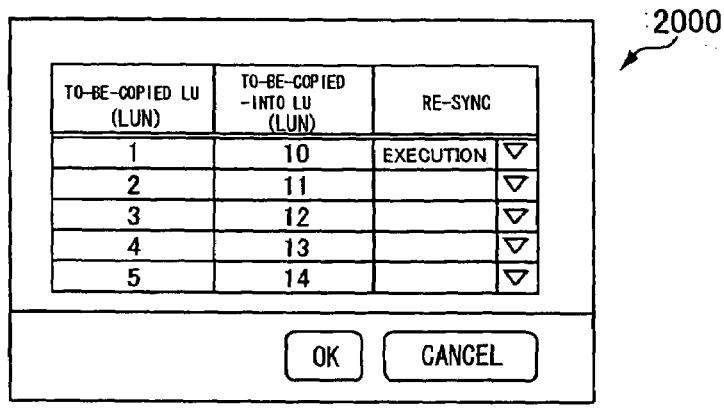
FIG. 20 shows a setting Web page used for instructing a shift from the "split state" to the "pair state," according to the present embodiment.
Figure 21:
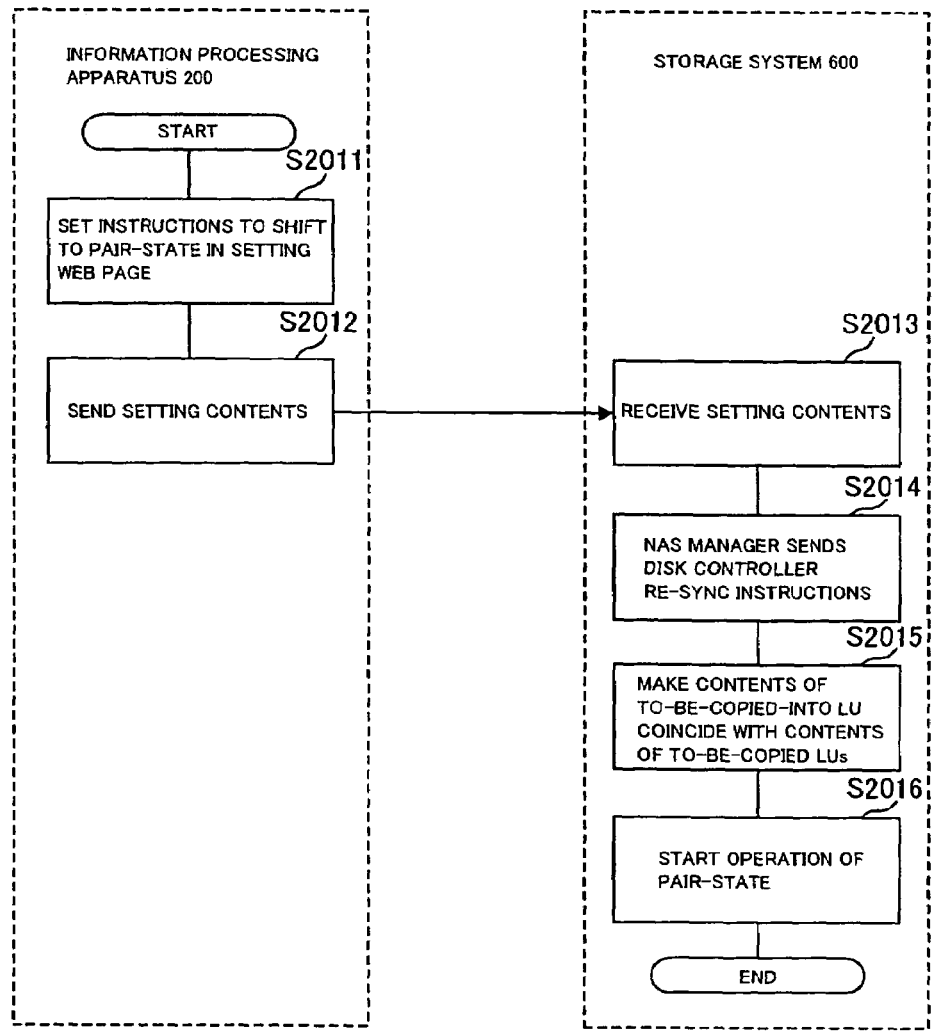
FIG. 21 is a flow chart explaining the process associated with the shift from the "split state" to the "pair state"

When the backup is completed, or the snap shot images need not be kept, the state shifts from the "split state" to the "pair state." This shift can be instructed from the information processing apparatus 200 by use of the setting Web page of FIG. 20. The processing in this case will be described with reference to the flow chart of FIG. 21.

To instruct to shift into the "pair state" (resuming of the replication managing processing) for a pair of a to-be-copied LU and a to-be-copied-into LU, "execution" is entered in a re-sync column of the setting Web page 2000 of FIG. 20 (S2111). When the user clicks on the "OK" button, a notice is sent to the NAS manager 706 from the information processing apparatus 200 (S2112). The NAS manager 706 which has received the notice (S2113) sends the disk controller 140 a command to instruct the pair of the to-be-copied LU and the to-be-copied-into LU to shift into the "pair state" (hereinafter, referred to as "re-sync instructions") (S2114). When the command is received, the replication managing program 760 running on the disk controller 140 makes the contents of the to-be-copied LU coincide with the contents of the to-be-copied-into LU by using data of the differences managed (S2115). After the contents of the to-be-copied LU coincide with the contents of the to-be-copied-into LU, the replication managing program 760 shifts the to-be-copied LU and the to-be-copied-into LU into the "pair state" (S2116).

The above-described replication process utilizing difference data from the to-be-copied LU to the to-be-copied-into LU is realized by employing the invention disclosed for example in the U.S. Pat. No. 6,643,667 to Arai et al. With respect to the replication process of the replication managing program 760, the U.S. Pat. No. 6,643,667 is herein incorporated by reference. For example, the replication managing program 760 based on the data illustrated in FIGS. 3 and 4 and so on in the U.S. Pat. No. 6,643,667 stored in the NVRAM 144 or the shared memory 120 or the like executes the replication process shown for example in FIGS. 5, 6, 10A and 10B in the U.S. Pat. No. 6,643,667 by utilizing the NVRAM 144 or the cache memory 130 or the like. Accordingly, a high-speed replication process is realized through execution of the replication process of the block data from the to-be-copied LU to the to-be-copied-into LU.

Figure 22:
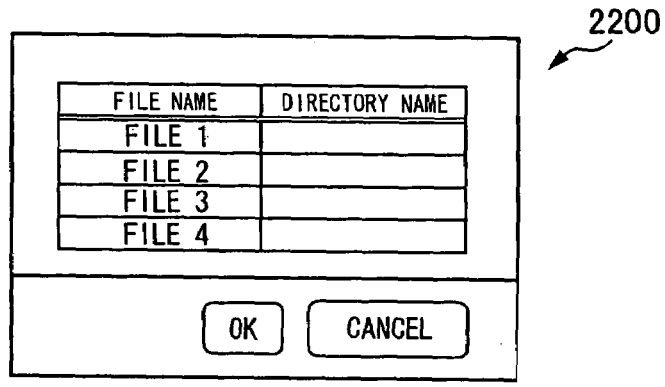
FIG. 22 shows a setting Web page used for selecting individual files and directories, whether to apply the replication management function, according to the present embodiment.
Figure 23:
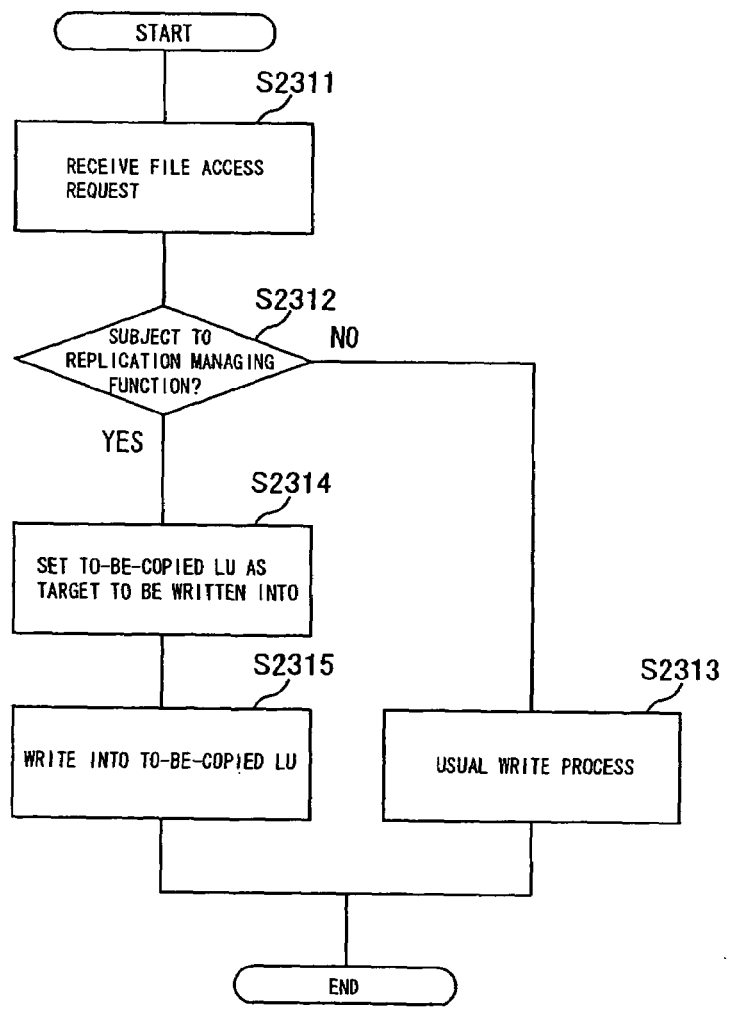
FIG. 23 is a flow chart explaining the process of selecting individual files and directories, whether to apply the replication management function, according to the present embodiment.

Whether the replication managing function is applied may be set for individual files or directories. Files and directories, to which the replication managing function is set to be applied, have their copies stored or created automatically in the respective to-be-copied-into LUs. FIG. 22 shows an example of the setting Web page used for setting whether to apply the replication managing function for individual files or directories. In this setting Web page 2200, the files names and directories to which the replication managing function is to be applied can be specified. By clicking on the "OK" button, the contents set in the setting Web page 2200 is sent to the NAS manager 706. The NAS manager 706 stores the setting contents in the shared memory 120. The contents of the shared memory 120 are referenced by the file system program 703, for example, when the storage system 600 has received a file access request to access a file or directory to which the replication managing function is set to be applied. This processing performed by the file system program 703 will be described with reference to the flow chart of FIG. 23.

When the storage system 600 receives a file access request (S2311), the file system program 703 references the contents of the shared memory 120 to examine whether the file or directory specified in the file access request is subject to the replication managing function (S2312). If not (S2312: NO), a usual writing processing is executed (S2313). On the other hand, if the file or directory is subject to the replication managing function (S2312: YES), the metadata 730 is set such that the area where the write data is to be written into is in the memory area of the LU designated as the to-be-copied LU by the replication managing function (S2314). Therefore, the file subject to the replication managing function is stored in the to-be-copied LU, and a copy of the file subject to the replication managing function and the metadata 730 thereof are automatically stored in the to-be-copied-into LU (S2315). Since the metadata 730 is automatically stored in the to-be-copied-into LU by the replication managing function, data stored in the to-be-copied-into LU can also be managed by the file system program 703.

The above-described replication process of the data including the metadata 730 from the to-be-copied LU to the to-be-copied-into LU is realized by employing the invention disclosed for example in the U.S. Pat. No. 6,643,667. With respect to the replication process of the replication managing program 760, the U.S. Pat. No. 6,643,667 is herein incorporated by reference. For example, the replication managing program 760 based on the data illustrated in FIGS. 3 and 4 and so on in the U.S. Pat. No. 6,643,667 stored in the NVRAM 144 or the shared memory 120 or the like executes the copying process shown for example in FIGS. 2, 5, 6, 9, 10A and 10B in the U.S. Pat. No. 6,643,667 by utilizing the NVRAM 144 or the cache memory 130 or the like. Accordingly, a high-speed replication process is realized through execution of the replication process of the block data from the to-be-copied LU to the to-be-copied-into LU.

Figures 24, 25:
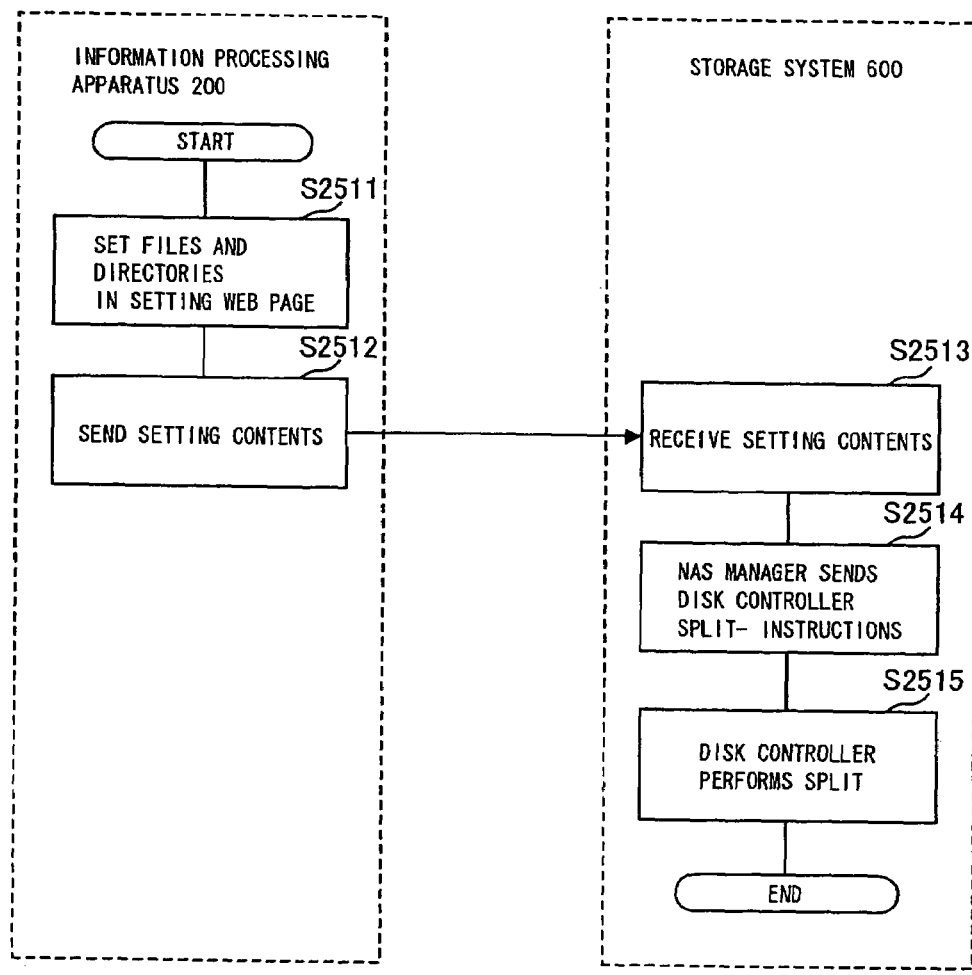
FIG. 24 shows a setting Web page used for creating a snap shot image for individual files and directories, according to the present embodiment.
FIG. 25 is a flow chart explaining the process of creating a snap shot image for individual files and directories, according to the present embodiment.

A snap shot image can be created for individual files or directories. FIG. 24 shows an example of the setting Web page used in creating a snap shot image for individual files or directories. In this setting Web page 2400, files and directories for which a snap shot image is created, and the date and hour when the snap shot is to be executed can be specified.

FIG. 25 is a flow chart for explaining the process of creating a snap shot image for individual files and directories. Files and directories are designated in the setting web page (S2511). Thereafter, by clicking on the "OK" button, the setting contents of the snap shot in the setting Web page 2700 are sent to the NAS manager 706 (S2512). When the setting contents are received (S2513), the NAS manager 706 sends the disk controller 140 "split instructions" for pairs of a to-be-copied LU where a file or directory specified in the setting contents is stored and a to-be-copied-into LU where a copy thereof is managed (S2514). When "split instructions" are received, the replication managing program 760 of the disk controller 140 performs split to resolve the pairs (S2515). Thus, snap shot images of files and directories specified in the setting contents are kept in the to-be-copied-into LUs. Because snap shot images can be created not only for individual LUs but also for individual files and directories in this way, meticulous services can be provided.

Securing of Consistency

Figure 26:
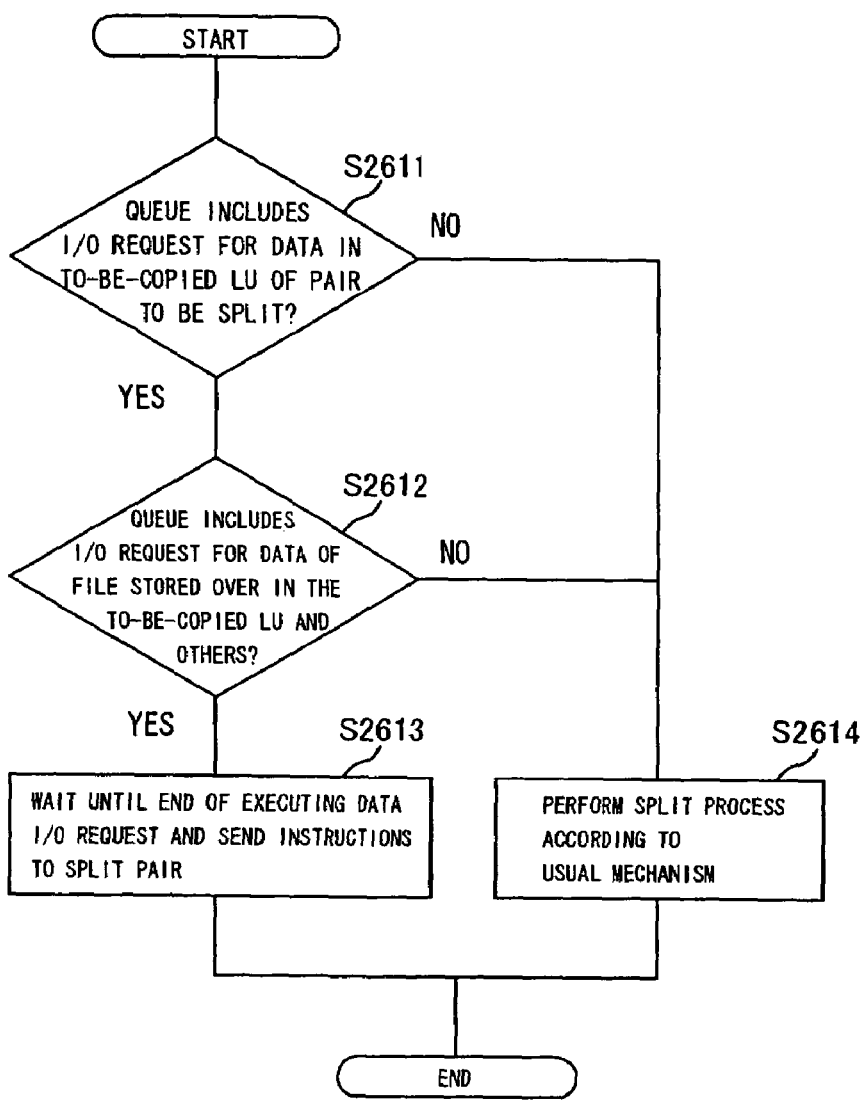
FIG. 26 is a flow chart explaining a mechanism to ensure consistency in the whole file data, according to the present embodiment.

For the reason, for example, that data size is enormous, data of a file (hereinafter, referred to as "file data") may be stored over a plurality of LUs. Herein, while such file data is being written into a storage device 300, if a to-be-copied LU into which the data is being written and a to-be-copied-into LU forming a pair therewith shifts to the "split state," the consistency of the whole file data in the to-be-copied-into LU will not be ensured. Therefore, the storage system 600 of the present embodiment is provided with a mechanism that ensures the consistency of the whole file data even in such a case. This mechanism will be specifically described with reference to the flow chart of FIG. 26.

When the NAS manager 706 is going to send "split instructions" for a pair of a to-be-copied LU and a to-be-copied-into LU, the NAS manager 706 checks whether the data I/O request queue for the storage device 300 managed by the OS 701 contains a data I/O request to access the to-be-copied LU of the pair (S2611). If such a data I/O request is contained in the queue (S2611: YES), the NAS manager 706 further checks whether the queue contains a data I/O request to access a file that is stored (or to be stored) over the to-be-copied LUs (S2612). If such a data I/O request is contained (S2612: YES), the NAS manager 706 waits until processing of the data I/O request is finished and sends the replication managing program 760 "split instructions" for the pair (S2613). Thus, the consistency of the whole file data is ensured in the to-be-copied-into LUs. Note that if (S2611: NO) or (S2612: NO), processing associated with the split is performed by use of the abovementioned usual mechanism (S2614).

Note that in writing or reading into or from the storage device 300 according to a data I/O request, all to-be-copied LUs are not necessarily written or read into or from at the same time. Hence, before the whole processing of the data I/O request is finished, "split instructions" may be sent when the completion of the processing for the pair to be split is confirmed.

Since the setting and control of the replication managing function can be performed from the information processing apparatus 200 by use of the setting Web page, a flexible operation of the replication managing function from the viewpoint of a user utilizing the information processing apparatus 200 is possible. Further, since the setting and control of the replication managing function can be performed not only for individual LUs but also for individual files and directories, services can be improved for a user of the information processing apparatus 200. Note that the setting and control described above can be arranged to be performed from the managing terminal 160.

In the present embodiment of the invention, the managing terminal 160 or the NAS manager 706 provides "pairing instructions," "pair delete instructions," "split instructions," "re-sync instructions" and so on to the replication managing program 760 of the disk controller 140. The replication managing program 760 shifts the states according to the instructions from the managing terminal 160 or the NAS manager 706. The shift of the state is accomplished by, for example, the invention disclosed in the U.S. Pat. No. 6,643,667. With respect to the state shift process of the replication managing program 760, the U.S. Pat. No. 6,643,667 is herein incorporated by reference.

It should be noted that, in the embodiment of the present invention, the replication managing program 760 is illustratively described as executed in the disk controller 140. However, the embodiment of the present invention should not be taken limitative to the above, but preferably the replication managing program 760 is executed in the CHA 110, CHF 110 or CHN 110.

Remote Copy

As for the abovementioned remote copy (replication) function implemented by that the CPU 142 of the disk controller 140 executes software stored in the NVRAM 144, the setting and control thereof can also be performed by use of the setting Web page provided by the NAS manager 706. During the operation of the remote copy function, when data is written into a to-be-copied LU (hereinafter, referred to as "primary LU") in the storage system 600, the data is sent from the storage system 600 to another system 610 via the SAN 500, and written into an LU (hereinafter, referred to as "secondary LU") of the storage system 610 as well. In this way, during the operation of the remote copy function, the contents of the primary LU and the secondary LU are controlled to coincide with each other.

There are a synchronous method and an asynchronous method for the methods of the remote copy. In the case of the synchronous method, when a data input/output request to write data into a primary LU is received from the information processing apparatus 200, the storage system 600 writes the data associated with the data input/output request into the primary LU and sends the storage system 610 the same data as the data written. When the data sent from the storage system 600 is received, the storage system 610 writes the data into the secondary LU and notifies the storage system 600 of the effect that the data has been written. The storage system 600 received the notice sends an information processing apparatus 200 a message notifying the completion of writing data.

As described above, in the case of the synchronous method, the information processing apparatus 200 is not notified of the completion until it is confirmed that the data has been written into both the primary LU and the secondary LU. Therefore, the consistency between the contents of the primary LU and the contents of the secondary LU is secured in the synchronous method when the information processing apparatus 200 receives the completion notice. Note that, in the case of the synchronous method, the information processing apparatus 200 is not notified of the completion until the data has been written into the secondary LU. Hence, in the case of the synchronous method, the response time, from when an information processing apparatus 200 to access the storage system 600 sends the storage system 600 a data input/output request until when the completion notice is returned to the information processing apparatus 200, is usually longer than that in the case of the asynchronous method.

In the case of the asynchronous method, the storage system 600 received a data input/output request to write data into a primary LU from an information processing apparatus 200 writes the data into the primary LU according to this request and sends the same data to the storage system 610. When the data sent from the storage system 600 is received, the storage system 610 writes the data into the secondary LU and notifies the storage system 600 of the effect that the data has been written. Herein, the storage system 600 notifies the information processing apparatus 200 of the completion associated with the above data input/output request after the storage system 600 has written the data into the primary LU, regardless of whether the data has been written into the storage system 610. Hence, in the case of the asynchronous method, the response time to the information processing apparatus 200 is usually shorter than that in the case of the synchronous method. Note that the consistency in data between the primary LU and the secondary LU is not necessarily ensured even when the information processing apparatus 200 receives the completion notice, unlike in the synchronous method. Note that the storage system 600 usually manages information about the differences in the contents between the primary LU and the secondary LU when the remote copy is applied.

Figure 27:
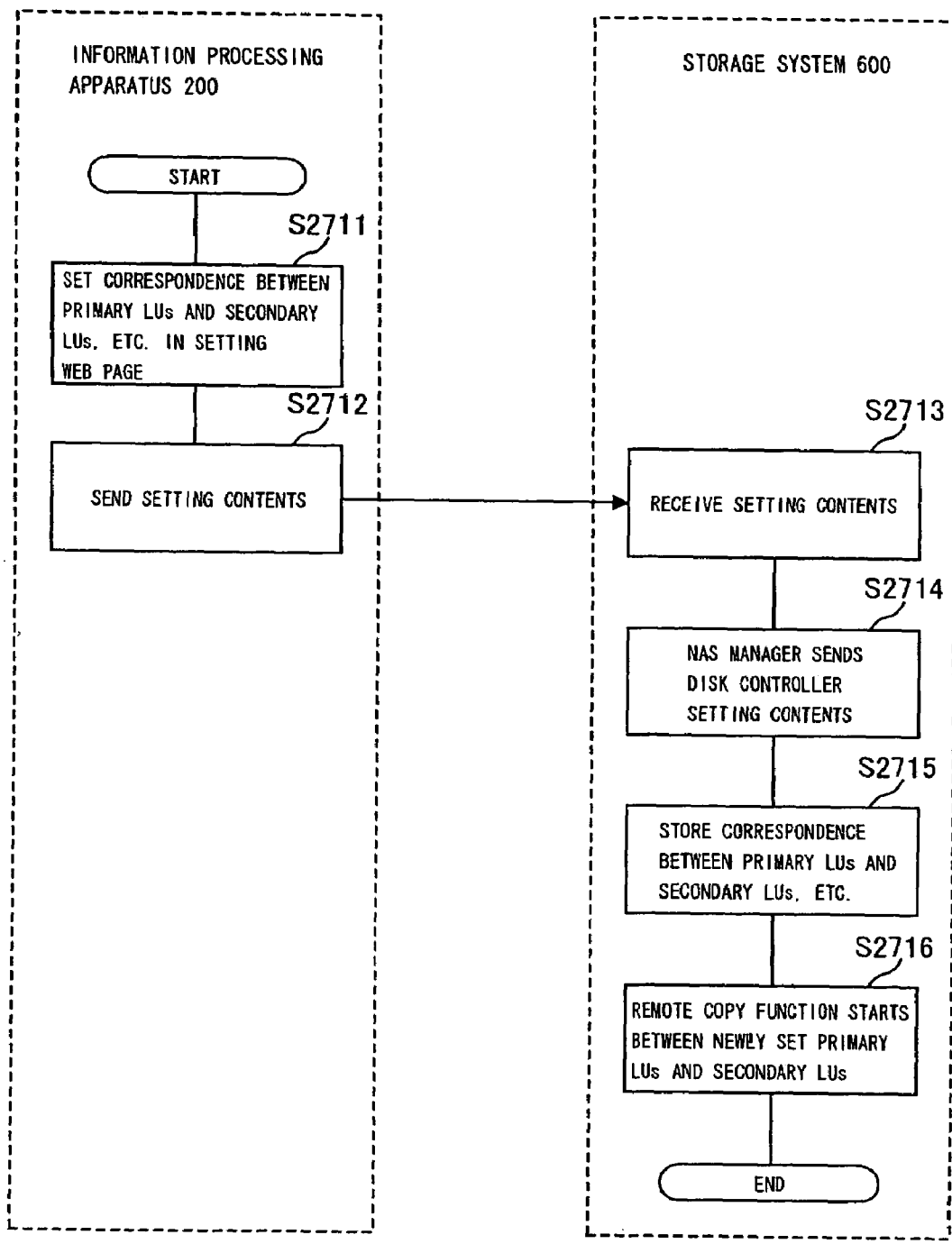
FIG. 27 is a flow chart explaining the process associated with the setting of correspondence between primary LUs and secondary LUs for a remote copy function, according to the present embodiment.

The setting associated with the remote copy function such as the abovementioned correspondence between a primary LU and a secondary LU, and the selection between the synchronous method and the asynchronous method can be performed from the information processing apparatus 200 by use of a setting Web page provided by the NAS manager 706. The processing associated with the setting of the remote copy function will be described with reference to the flow chart of FIG. 27. FIG. 28 shows an example of the setting Web page used for this setting.

To set the correspondence between a primary LU and a secondary LU, the LUN of a primary LU is entered in a primary LU column of the setting Web page 2800, and the LUN of a secondary LU is entered in a secondary LU column on the right thereof. By putting a check on a check column on the right thereof, the selection for this remote copy pair to be operated according to the synchronous method or the asynchronous method can be made (S2711). By clicking on the "OK" button, the contents set in the setting Web page is sent to the NAS manager 706 from the information processing apparatus 200 (S2712).

When the NAS manager 706 receives the setting contents (S2713), the NAS manager 706 sends the disk controller 140 the contents (S2714). When these setting contents are received, the disk controller 140 stores the correspondence between the primary LU and the secondary LU and the selection of which method of remote copy is used for this pair, which are among the contents, in the memory 143 (S2715).

The remote copy control program 750 executes remote copy according to the relationship between the primary LU and the secondary LU and the selection of the remote copy method stored in the memory 143. Therefore, after the above processing, the control starts to store the contents of the newly designated primary LU in the secondary LU as well (S2716). It is noted that this control is performed according to the selected remote copy method.

It can also be chosen for individual files and directories whether the remote copy function is applied. In this case, files and directories to which the remote copy function is set to be applied are automatically stored or created in a primary LU. FIG. 29 shows an example of the setting Web page used for setting whether the remote copy function is applied for individual files and directories. A file name to apply the remote copy function is entered in a "file name" column of the setting Web page 2900, and a directory name to apply the remote copy function is specified in a "directory name" column of this drawing. By clicking on the "OK" button, the contents set in the setting Web page 2900 are sent to the NAS manager 706. When the setting contents are received, the NAS manager 706 stores the contents in the memory 113. The contents stored in the memory 113 are referenced by the file system program 703 when the storage system 600 receives a file access request to access a file or directory, to which the remote copy function is set to be applied, from an information processing apparatus 200.

Figure 30:
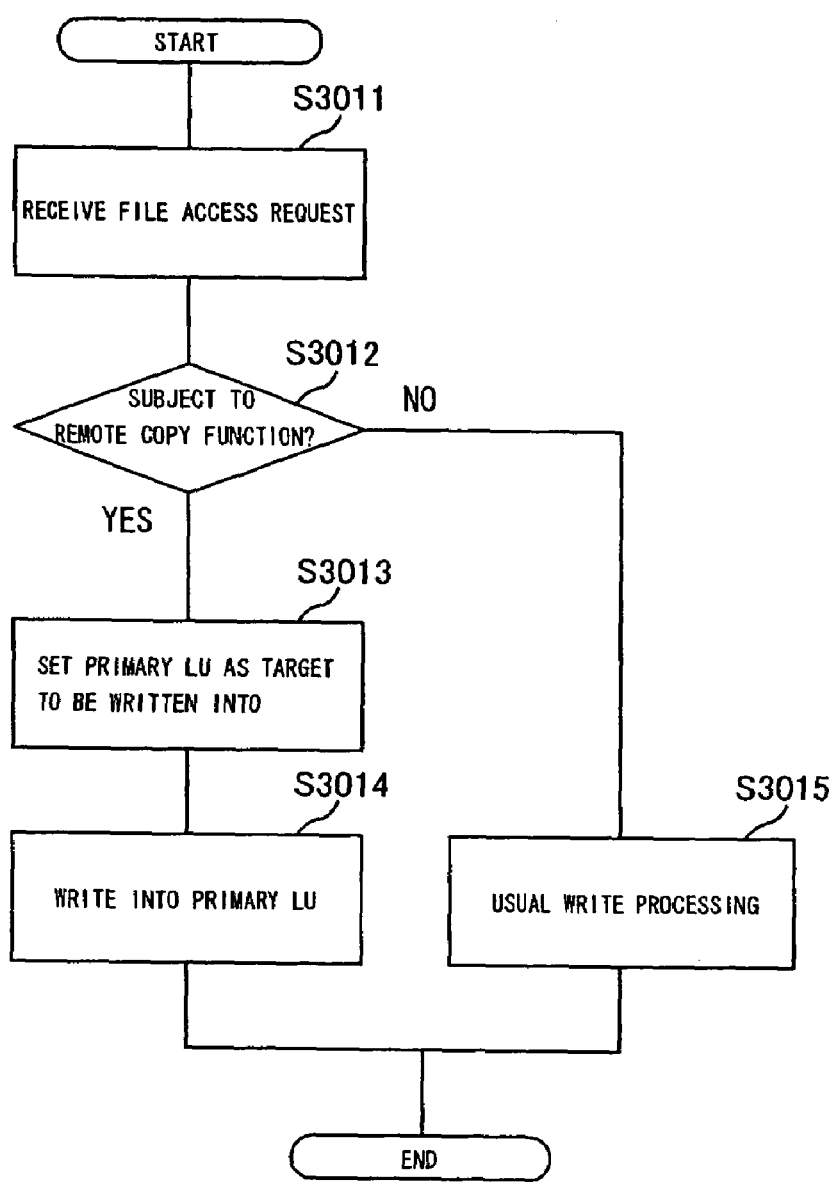
FIG. 30 is a flow chart explaining the process performed when a request to access a file, to which the remote copy function is set to be applied, is received, according to the present embodiment.

Next, the processing of the file system program 703 will be described with reference to the flow chart of FIG. 30.

When the storage system 600 receives a file access request (S3011), the file system program 703 references the contents of the memory 143 to examine whether the remote copy function is set to be applied to the file or directory specified in the file access request (S3012). When the file or directory is subject to the remote copy function (S3012: YES), the metadata 730 is set such that the area where the write data is to be written into is in the memory area of the LU designated as the primary LU by the remote copy function (S3013). Accordingly, the file subject to the remote copy function is stored in the primary LU (S3014), and a copy of the file subject to the remote copy function and the metadata 730 are automatically stored in the secondary LU. In the case where (S3012: NO), a usual write processing is executed (S3015).

The replication process of the data including the metadata 730 from the primary LU to the secondary LU is realized by employing the invention disclosed for example in the U.S. Pat. No. 6,643,667. With respect to the replication process of the remote copy control program 750, the U.S. Pat. No. 6,643,667 is herein incorporated by reference. For example, the remote copy control program 750 shifts to the state in which the remote copy is executable by communicating with the remote copy control program 750 of the disk controller 140 in another storage system 610 for example via the network such as the SAN 500. The remote copy control program 750 mutually cooperates with another storage system 610 to execute the replication process via for example the network such as the SAN 500. In this instance, the remote copy control program 750 based on the data illustrated in FIGS. 3 and 4 and so on in the U.S. Pat. No. 6,643,667 stored in the NVRAM 144 or the shared memory 120 or the like in the storage system 600 or another storage system 610 executes the copying process shown for example in FIGS. 2, 5, 6, 9, 10A and 10B in the U.S. Pat. No. 6,643,667 by utilizing the NVRAM 144 or the cache memory 130 or the like.

In the embodiment of the present invention, it is described that the remote copy control program 750 executes the replication process by mutually cooperating with the remote copy control program 750 of another storage system 610. However, the embodiment of the present invention should not be taken limitative to the above. The remote copy control program 750 of one storage system 600 which takes the initiative as a master program may execute the replication process by utilizing the remote copy control program 750 of another storage system 610 as a slave program. Alternatively, the remote copy control program 750 of another storage system 610 which takes the initiative as a master program may execute the replication process by utilizing the remote copy control program 750 at the primary LU as a slave program.

Note that, the metadata 730 is also automatically stored in the secondary LU by the remote copy function, and thus the file system can recognize data stored in the secondary LU as a file. Therefore, when the file system program is running in the storage system 610, the storage system 610 can recognize data stored in the secondary LU as a file. Even if the storage system 610 accepts access in blocks only, an information processing apparatus 200 can recognize data stored in a secondary LU as a file by use of the metadata 730, for example, when the file system is running on the information processing apparatus 200 directly accessing the storage system 610 providing a secondary LU.

In the storage system 600 described above, an information processing apparatus 200 can perform the setting and control of the remote copy function by use of the setting Web page provided by the NAS manager 706. Thus, the flexible operation of the remote copy function from the view point of a user using the information processing apparatus 200 is possible, so that services are improved. Note that the setting and control described above can be arranged to be performed from the managing terminal 160.

In the embodiment of the present invention, also in the remote copy process, the managing terminal 160 or the NAS manager 706 provides "pairing instructions," "pair delete instructions," "split instructions," "re-sync instructions" and so on to the remote copy control program 750 of the disk controller 140. The remote copy control program 750 shifts the states according to the instructions from the managing terminal 160 or the NAS manager 706. The shift of the state is accomplished by, for example, the invention disclosed in the U.S. Pat. No. 6,643,667. With respect to the state shift process of the remote copy control program 750, the U.S. Pat. No. 6,643,667 is herein incorporated by reference. In this instance, the remote copy control program 750 at the primary LU side mutually cooperates with the remote copy control program 750 of another storage system 610 at the secondary LU side to shift the state by communication via for example the network such as the SAN 500.

It should be noted that, in the embodiment of the present invention, the remote copy control program 750 is illustratively described as executed in the disk controller 140. However, the embodiment of the present invention should not be taken limitative to the above, but preferably the remote copy control program 750 is executed in the CHA 110, CHF 110 or CHN 110.

Further, in the embodiment of the present invention, it is described that the remote copy control program 750 at the primary LU side shifts the state by mutually cooperating with the remote copy control program 750 at the secondary LU side. However, the embodiment of the present invention should not be taken limitative to the above. The remote copy control program 750 at the primary LU side which takes the initiative as a master program may shift the state as following the remote copy control program 750 at the primary LU side by utilizing the remote copy control program 750 at the secondary LU side as a slave program. Alternatively, the remote copy control program 750 at the secondary LU side which takes the initiative as a master program may shift the state as following the remote copy control program 750 at the secondary LU side by utilizing the remote copy control program 750 at the primary LU as a slave program.

Although the preferred embodiment of the present invention has been described in detail, it should be understood that various changes, substitutions and alterations can be made therein without departing from the spirit and scope of the invention as defined by the appended claims.

What is claimed is:

1. A method of controlling a storage device controlling apparatus which includes:

a plurality of channel controllers having a circuit board on which are formed a file access processing section receiving requests to input and output data in files as units from an information processing apparatus via a network and an I/O processor outputting I/O requests corresponding to said requests to input and output data to a storage device, said file access processing section further translating data associated with a received file access request to produce converted data which can be processed by said I/O processor and sending said converted data to said I/O processor; and a disk controller executing input and output of data into and from said storage device in response to the I/O requests sent from said I/O processors, and which manages a memory area provided by said storage device in logical volumes, which are memory areas logically set on the memory area, said method comprising the step of:

performing, by said disk controller, a replication management processing whereby data is also written into a second logical volume to store a copy of the data in the second logical volume, when said data is written into a first logical volume, wherein at least one of the channel controllers or the disk controller is configured to selectively perform:

copying data from a source logical unit (LU) to a destination LU on an LU basis; and copying data from the source LU to the destination LU on a file basis, wherein copying on an LU basis includes copying data from the source LU to the destination LU based on difference data indicative of differences between data stored on the source LU and data stored on the destination LU, wherein copying on a file basis includes copying a subject file and metadata associated with the subject file to the destination LU.

2. A method of controlling a storage device controlling apparatus according to claim 1 further comprising the steps of:

receiving, by each of at least one of said channel controllers, information specifying said to-be-copied data in files or directories as units, said information being sent from said information processing apparatus; and identifying, by each said at least one channel controller, data of a file or directory specified by said information received and controlling such that the data is stored in said first logical volume.

3. A method of controlling a storage device controlling apparatus according to claim 1 further comprising the steps of:

receiving, by each of at least one of said channel controllers, first information specifying said to-be-copied data in files or directories as units, said first information being sent from said information processing apparatus;

identifying, by each said at least one channel controller, data of a file or directory specified by said first information received and controlling such that the data is stored in said first logical volume;

receiving, by each said at least one channel controller, second information instructing to stop said replication management processing, said second information being sent from said information processing apparatus;

notifying, by each said at least one channel controller, said disk controller of an effect when said second information is received;

stopping by said disk controller, when receiving said notifying, said replication management process; and starting to write into a plurality of first logical volumes after said replication management processing stops if writing into said storage device data of a file or directory specified by said first information causes writing into the plurality of first logical volumes, when said second information is received.

4. A method of controlling a storage device controlling apparatus according to claim 1, wherein the channel controllers include at least one enabled to communicate with the information processing apparatus through a LAN and at least one enabled to communicate with the information processing apparatus through a Fibre Channel.

5. A method of controlling a storage device controlling apparatus according to claim 4, wherein each of the channel controllers enabled to communicate with the information processing apparatus through a LAN is provided with its individual network address.

6. A method of controlling a storage device controlling apparatus according to claim 4, wherein each of the channel controllers enabled to communicate with the information processing apparatus through a LAN includes a NAS manager providing a setting Web page for setting the replication managing function.

7. A method of controlling a storage device controlling apparatus which includes:

a plurality of channel controllers having a circuit board on which are formed a file access processing section receiving requests to input and output data in files as units from an information processing apparatus via a network and an I/O processor outputting I/O requests corresponding to said requests to input and output data to a storage device, said file access processing section further translating data associated with a received file access request to produce converted data which can be processed by said I/O processor and sending said converted data to said I/O processor; and a disk controller executing input and output of data into and from said storage device in response to the I/O requests sent from said I/O processors, and which manages a memory area provided by said storage device in logical volumes, which are memory areas logically set on the memory area, said method comprising the step of:

performing, by said disk controller, a processing whereby data is sent to another storage device controlling apparatus to store a copy of the data also in a second logical volume provided by said another storage device controlling apparatus, when said data is written into a first logical volume, wherein at least one of the channel controllers or the disk controller is configured to selectively perform:
copying data from a source logical unit (LU) to a destination LU on an LU basis; and
copying data from the source LU to the destination LU on a file basis,
wherein copying on an LU basis includes copying data from the source LU to the destination LU based on difference data indicative of differences between data stored on the source LU and data stored on the destination LU,
wherein copying on a file basis includes copying a subject file and metadata associated with the subject file to the destination LU.

8. A method of controlling a storage device controlling apparatus according to claim 7 further comprising the steps of:

receiving, by each of at least one of said channel controllers, information specifying said to-be-copied data in files or directories as units, said information being sent from said information processing apparatus; and identifying, by each said at least one channel controller, data of a file or directory specified by said first information received and controlling such that the data is stored in said first logical volume.

9. A method of controlling a storage device controlling apparatus according to claim 7, wherein the channel controllers include at least one enabled to communicate with the information processing apparatus through a LAN and at least one enabled to communicate with the information processing apparatus through a Fibre Channel.

10. A method of controlling a storage device controlling apparatus according to claim 9, wherein each of the channel controllers enabled to communicate with the information processing apparatus through a LAN is provided with its individual network address.

11. A storage device controlling apparatus which includes:

a plurality of channel controllers having a circuit board on which are formed a file access processing section receiving requests to input and output data in files as units from an information processing apparatus via a network and an I/O processor outputting I/O requests corresponding to said requests to input and output data to a storage device, said file access processing section further translating data associated with a received file access request to produce converted data which can be processed by said I/O processor and sending said converted data to said I/O processor; and a disk controller executing input and output of data into and from said storage device in response to the I/O requests sent from said I/O processors, and which manages a memory area provided by said storage device in logical volumes, which are memory areas logically set on the memory area, said disk controller comprises a section which performs a replication management processing whereby data is also written into a second logical volume to store a copy of the data in the second logical volume, when said data is written into a first logical volume, wherein at least one of the channel controllers or the disk controller is configured to selectively perform:

copying data from a source logical unit (LU) to a destination LU on an LU basis; and copying data from the source LU to the destination LU on a file basis, wherein copying on an LU basis includes copying data from the source LU to the destination LU based on difference data indicative of differences between data stored on the source LU and data stored on the destination LU, wherein copying on a file basis includes copying a subject file and metadata associated with the subject file to the destination LU.

12. A storage device controlling apparatus according to claim 11, wherein each of at least one of said channel controllers comprises a section which receives information specifying said to-be-copied data in files or directories as units, said information being sent from said information processing apparatus; and wherein each said at least one channel controller further comprises a section which receives said information, identifies data of a file or directory specified by said information, and controls such that the data is stored in said first logical volume.

13. A storage device controlling apparatus according to claim 11, wherein each of at least one of said channel controllers comprises a section which receives first information specifying said to-be-copied data in files or directories as units, said first information being sent from said information processing apparatus; a section which identifies data of a file or directory specified by said first information received and controls such that the data is stored in said first logical volume; a section which receives second information instructing to stop said replication management processing, said second information being sent from said information processing apparatus; and a section which notifies said disk controller of an effect when said second information is received;

wherein said disk controller further comprises a section which stops said replication management processing when said notice is received; and wherein each said at least one channel controller further comprises a section which starts to write into a plurality of first logical volumes after said replication management processing stops if writing into said storage device data of a file or directory specified by said first information causes writing into the plurality of first logical volumes, when said second information is received.

14. A storage device controlling apparatus according to claim 11, wherein the channel controllers include at least one enabled to communicate with the information processing apparatus through a LAN and at least one enabled to communicate with the information processing apparatus through a Fibre Channel.

15. A method of controlling a storage device controlling apparatus according to claim 14, wherein each of the channel controllers enabled to communicate with the information processing apparatus through a LAN is provided with its individual network address.

16. A storage device controlling apparatus according to claim 14, wherein each of the channel controllers enabled to communicate with the information processing apparatus through a LAN includes a NAS manager providing a setting Web page for setting the replication managing function.

17. A storage device controlling apparatus which includes:

a plurality of channel controllers having a circuit board on which are formed a file access processing section receiving requests to input and output data in files as units from an information processing apparatus via a network and an I/O processor outputting I/O requests corresponding to said requests to input and output data to a storage device, said file access processing section further translating data associated with a received file access request to produce converted data which can be processed by said I/O processor and sending said converted data to said I/O processor; and a disk controller executing input and output of data into and from said storage device in response to the I/O requests sent from said I/O processors, and which manages a memory area provided by said storage device in logical volumes, which are memory areas logically set on the memory area, said disk controller comprises a section which performs a processing whereby data is sent to another storage device controlling apparatus to store a copy of the data also in a second logical volume provided by said another storage device controlling apparatus, when said data is written into a first logical volume, wherein at least one of the channel controllers or the disk controller is configured to selectively perform:

copying data from a source logical unit (LU) to a destination LU on an LU basis; and copying data from the source LU to the destination LU on a file basis, wherein copying on an LU basis includes copying data from the source LU to the destination LU based on difference data indicative of differences between data stored on the source LU and data stored on the destination LU, wherein copying on a file basis includes copying a subject file and metadata associated with the subject file to the destination LU.

18. A storage device controlling apparatus according to claim 17 wherein each of at least one of said channel controllers comprises a section which receives information specifying said to-be-copied data in files or directories as units, said information being sent from said information processing apparatus; and a section which identifies data of a file or directory specified by said information received and controls such that the data is stored in said first logical volume.

19. A storage device controlling apparatus according to claim 17, wherein the channel controllers include at least one enabled to communicate with the information processing apparatus through a LAN and at least one enabled to communicate with the information processing apparatus through a Fibre Channel.

20. A method of controlling a storage device controlling apparatus according to claim 19, wherein each of the channel controllers enabled to communicate with the information processing apparatus through a LAN is provided with its individual network address.

* * * * *